US012634150B2

(12) United States Patent
Marcatel et al.

(10) Patent No.: US 12,634,150 B2
(45) Date of Patent: May 19, 2026

(54) MEMORY MANAGEMENT IN A COMPUTER SYSTEM CONFIGURED FOR GENERATING A SIGNATURE AND APPARATUS FOR IMPLEMENTING THE SAME

(71) Applicants: BULL SAS, Les Clayes sous Bois (FR); UNIVERSITE GRENOBLE ALPES, Saint Martin D'Heres (FR); CENTRE NATIONAL DE LA RECHERCHE SCIENTIFIQUE, Paris (FR)

(72) Inventors: Etienne Marcatel, Plaisir (FR); Kevin Lebret, Conflans Sainte Honorine (FR); Philippe Elbaz-Vincent, Rodez France (FR)

(73) Assignee: BULL SAS, Les Clayes Sous Bois (FR)

( * ) Notice: Subject to any disclaimer, the term of this patent is extended or adjusted under 35 U.S.C. 154(b) by 165 days.

(21) Appl. No.: 18/376,940

(22) Filed: Oct. 5, 2023

(65) Prior Publication Data

US 2024/0154817 A1 May 9, 2024

(30) Foreign Application Priority Data

Oct. 6, 2022 (EP) .................................... 22306500

(51) Int. Cl.
*H04L 9/32* (2006.01)
(52) U.S. Cl.
CPC .................................. *H04L 9/3247* (2013.01)
(58) Field of Classification Search
None
See application file for complete search history.

(56) References Cited

PUBLICATIONS

"Shuo Sun, Fast Fourier Othrogonalization over NTRU Lattices, 2022, Iinstitute of Information Engineering, Chinese Academy of Sciences, pp. 1-19" (Year: 2022).*

(Continued)

*Primary Examiner* — Jeffrey C Pwu
*Assistant Examiner* — Mayasa A. Shaawat
(74) *Attorney, Agent, or Firm* — Meagher, Emanuel, Laks, Goldberg & Liao, LLP

(57) ABSTRACT

A computer-implemented method for memory management in a computer system configured for generating a signature of a binary data message m using a key B of a predetermined lattice-based structure is proposed, which comprises: determining coefficients of a 2×2 signature generation matrix SG, wherein the non-diagonal coefficients of the signature generation matrix SG are complex polynomials with a non-zero imaginary part, and the diagonal coefficients of the signature generation matrix SG are real polynomials; and determining a LDL representation of the signature generation matrix SG according to which SG is represented by a matrix product L.D.L*, wherein L is a 2×2 lower triangular matrix with ones on the diagonal, D is a 2×2 diagonal matrix, and L* is the adjoint of L; wherein the storing in a memory buffer of the computer system of the coefficients of the signature generation matrix SG and the coefficients of the matrices of the LDL representation is managed based on that the signature generation matrix SG has real diagonal coefficients, and the memory buffer is used alternatively to store the coefficients of the signature generation matrix SG or the coefficients of the matrix D of the LDL representation.

15 Claims, 11 Drawing Sheets

---

Algorithm 1 Fast Fourier Transform.

Input: A polynomial $f = \sum_{i=0}^{n} f_i x^i \in Q_{\kappa_0}$.

Output: $\hat{f} = DFT(f)$.

1: $t \leftarrow n$
2: for $\kappa = 1$ up to $\kappa_0$ do
3:    for $u = 0$ up to $2^{\kappa-1} - 1$ do
4:       $j \leftarrow u \cdot t$
5:       $s \leftarrow \zeta_{\kappa,u}$
6:       for $k = j$ up to $j + t/2$ do
7:          $x \leftarrow f_k$
8:          $y \leftarrow s \cdot f_{k+t/2}$
9:          $f_k \leftarrow x + y$
10:         $f_{k+t/2} \leftarrow x - y$
11:    $t \leftarrow t/2$
12: return $f$

(56)          References Cited

PUBLICATIONS

"Thomas Pornin, New Efficient, Constant-Time limplementations of Falcon, 2019, IACR International Association for Cryptologic Research vol. 20190885:222901 pp. 1-21" (Year: 2019).*

European Search Report for corresponding EP Application No. 22306500, dated Mar. 7, 2023.

Sun et al., "Fast Fourier Orthogonalization over NTRU Lattices", Springer Nature SwitzerlandAG, pp. 109-127, Aug. 24, 2022.

Zhao et al., "Quantum-safe HIBE: does it cost a Latte?", IACR, International Association for Cryptologic Research, vol. 20220503:130924, pp. 1-22, May 3, 2022.

Pornin, "New Efficient, Constant-Time Implementations of Falcon", IACR, International Association for Cryptologic Research, vol. 20190805:222901, pp. 1-21, Aug. 58, 2019.

Guo et al., A practical implementation of the signature scheme falcon suited for memory constrained device, Microelectronics & Computer, vol. 37, No. 9, pp. 50-55, Sep. 1, 2020.

Cooley et a;., "An Algorithm for the Machine Calculation of Complex Fourier Series", Mathematics of Computation, vol. 19, No. 90, pp. 297-301, Apr. 1965.

Dang et al., "Implementation and Benchmarking of Round 2 Candidates in the NIST Post-Quantum Cryptography Standardization Process Using Hardware and Software/Hardware Co-design Approaches", Cryptology ePrint Archive: Report 2020/795, Jun. 25, 2020.

Dang et al., "High-Speed Hardware Architectures and FPGA Benchmarking of CRYSTALS-Kyber, NTRU, and Saber", IEEE Transactions on Computers, vol. 72, pp. 306-320, Feb. 2023.

Ducas, et al., "Fast Fourier Orthogonalization", Cryptology ePrint Archive, Paper 2015/1014, 2015.

Gonzalez et al., "Verifying Post-Quantum Signatures in 8 kB of RAM", Post-Quantum Cryptography: 12th International Workshop, PQCrypto 2021, Daejeon, South Korea, Jul. 20-22, 2021, Proceedings 12. Springer International Publishing, 2021.

Gentry et al., "How to Use a Short Basis: Trapdoors for Hard Lattices and new Cryptographic Constructions", Electronic Collo-quium on Computational Complexity (ECCC), vol. 14, Sep. 25, 2008.

Hoffstein et al., "NTRU: A Ring-Based Public Key Cryptosystem", International Workshop on Ant Colony Optimization and Swarm Intelligence, pp. 268-288, 1998.

Karabulut et al., "Falcon Down: Breaking Falcon Post-Quantum Signatures Scheme through Side-Channel Attacks", 2021 58th ACM/IEEE Design Automation Conference (DAC), pp. 691-696, Dec. 2021.

Klein et al., "Finding the closets lattice vector when it's unusually close", ACM-SIAM Symposium on Discrete Algorithms, 2000.

McCarthy et al., "BEARZ attack FALCON: implementation attacks with countermeasures on the FALCON signature scheme", 17th International Joint Conference on e-Business and Telecommunications, Jul. 8, 2020-Jul. 10, 2020, Jul. 8, 2019.

Micciancio et al., "Trapdoors for Lattices: Simpler, Tighter, Faster, Smaller", IACR Cryptol. ePrint Arch. (2012), vol. 501, Sep. 14, 2011.

Nguyen et al., "High-Level Synthesis in Implementing and Benchmarking Number Theoretic Transform in Lattice-based Post-Quantum Cryptography using Software/Hardware Codesign", Applied Reconfigurable Computing. Architectures, Tools, and Applications, pp. 247-257, Mar. 1, 2020.

Oder et al., "Towards Practical Microcontroller Implementation of the Signature Scheme Falcon", Post-Quantum Cryptography, 2019.

Peikert, "An Efficient and Parallel Gaussian Sampler for Latitices", Annual Cryptology Conference, 2010.

Varma et al., "Post Quantum Secure Command and Control of Mobile Agent", International Journal of Semantic Computing, vol. 15, No. 03, pp. 359-379, 2021.

Wang et al., "Parameterized Hardware Accelerators for Lattice-Based Crytography and Their Application to the HW/SW Co-Design of qTESLA", IACR transactions on cryptographic hardware and embedded systems, vol. 2020, No. 3, pp. 269-306, 2020.

Zhao et al., "A Compact and High-Performance Hardware Architecture for CRYSTALS-Dilithium", IACR Transactions on Cryptographic Hardware and Embedded Systems, vol. 2022, No. 1, 270-295, Nov. 11, 2021.

\* cited by examiner

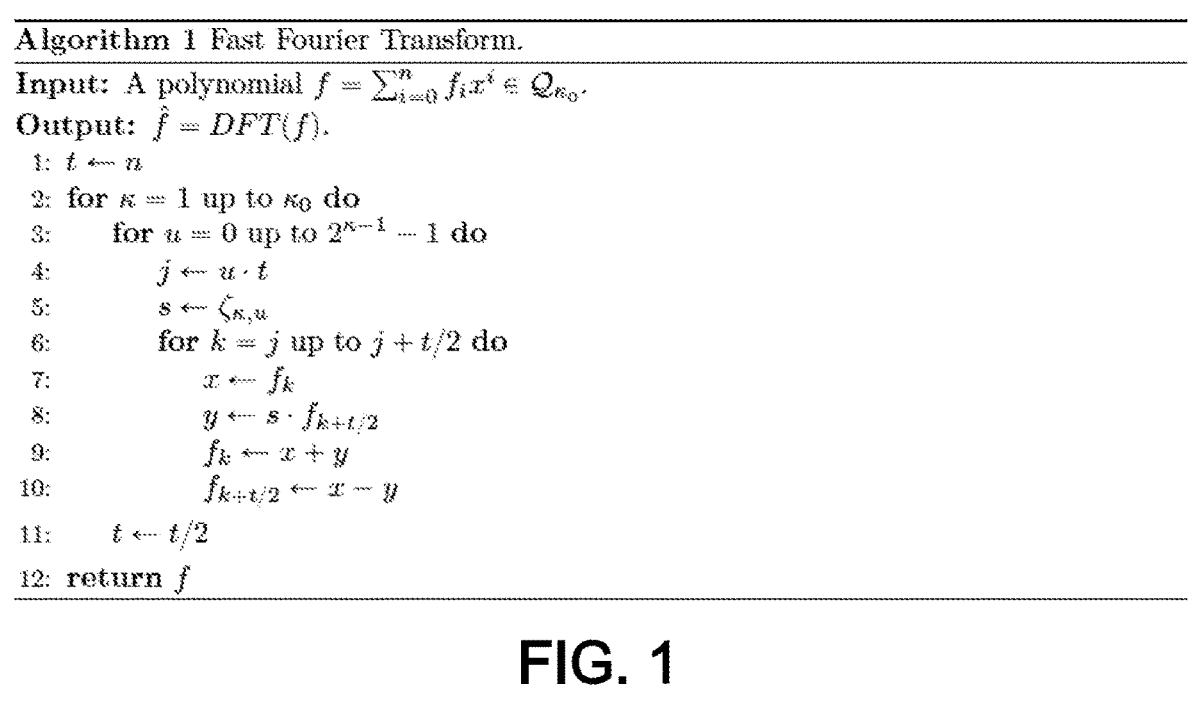

Algorithm 1 Fast Fourier Transform.
___
Input: A polynomial $f = \sum_{i=0}^{n} f_i x^i \in Q_{\kappa_0}$.
Output: $\hat{f} = DFT(f)$.
 1: $t \leftarrow n$
 2: for $\kappa = 1$ up to $\kappa_0$ do
 3:     for $u = 0$ up to $2^{\kappa-1} - 1$ do
 4:         $j \leftarrow u \cdot t$
 5:         $s \leftarrow \zeta_{\kappa,u}$
 6:         for $k = j$ up to $j + t/2$ do
 7:             $x \leftarrow f_k$
 8:             $y \leftarrow s \cdot f_{k+t/2}$
 9:             $f_k \leftarrow x + y$
10:             $f_{k+t/2} \leftarrow x - y$
11:     $t \leftarrow t/2$
12: return $f$
___

FIG. 1

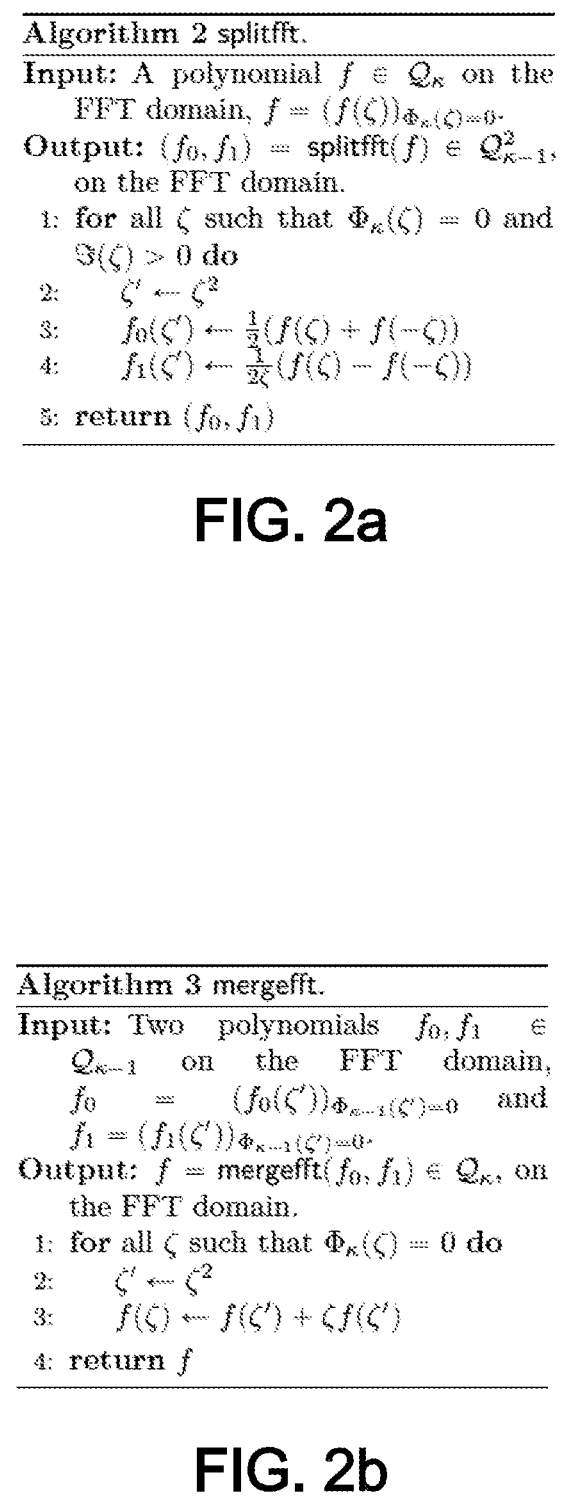

Algorithm 2 splitfft.
___

Input: A polynomial $f \in Q_\kappa$ on the FFT domain, $f = (f(\zeta))_{\Phi_\kappa(\zeta)=0}$.

Output: $(f_0, f_1) = \text{splitfft}(f) \in Q_{\kappa-1}^2$, on the FFT domain.

1: for all $\zeta$ such that $\Phi_\kappa(\zeta) = 0$ and $\Im(\zeta) > 0$ do
2:     $\zeta' \leftarrow \zeta^2$
3:     $f_0(\zeta') \leftarrow \frac{1}{2}(f(\zeta) + f(-\zeta))$
4:     $f_1(\zeta') \leftarrow \frac{1}{2\zeta}(f(\zeta) - f(-\zeta))$
5: return $(f_0, f_1)$
___

FIG. 2a

Algorithm 3 mergefft.
___

Input: Two polynomials $f_0, f_1 \in Q_{\kappa-1}$ on the FFT domain, $f_0 = (f_0(\zeta'))_{\Phi_{\kappa-1}(\zeta')=0}$ and $f_1 = (f_1(\zeta'))_{\Phi_{\kappa-1}(\zeta')=0}$.

Output: $f = \text{mergefft}(f_0, f_1) \in Q_\kappa$, on the FFT domain.

1: for all $\zeta$ such that $\Phi_\kappa(\zeta) = 0$ do
2:     $\zeta' \leftarrow \zeta^2$
3:     $f(\zeta) \leftarrow f(\zeta') + \zeta f(\zeta')$
4: return $f$
___

Figures 3, 4:
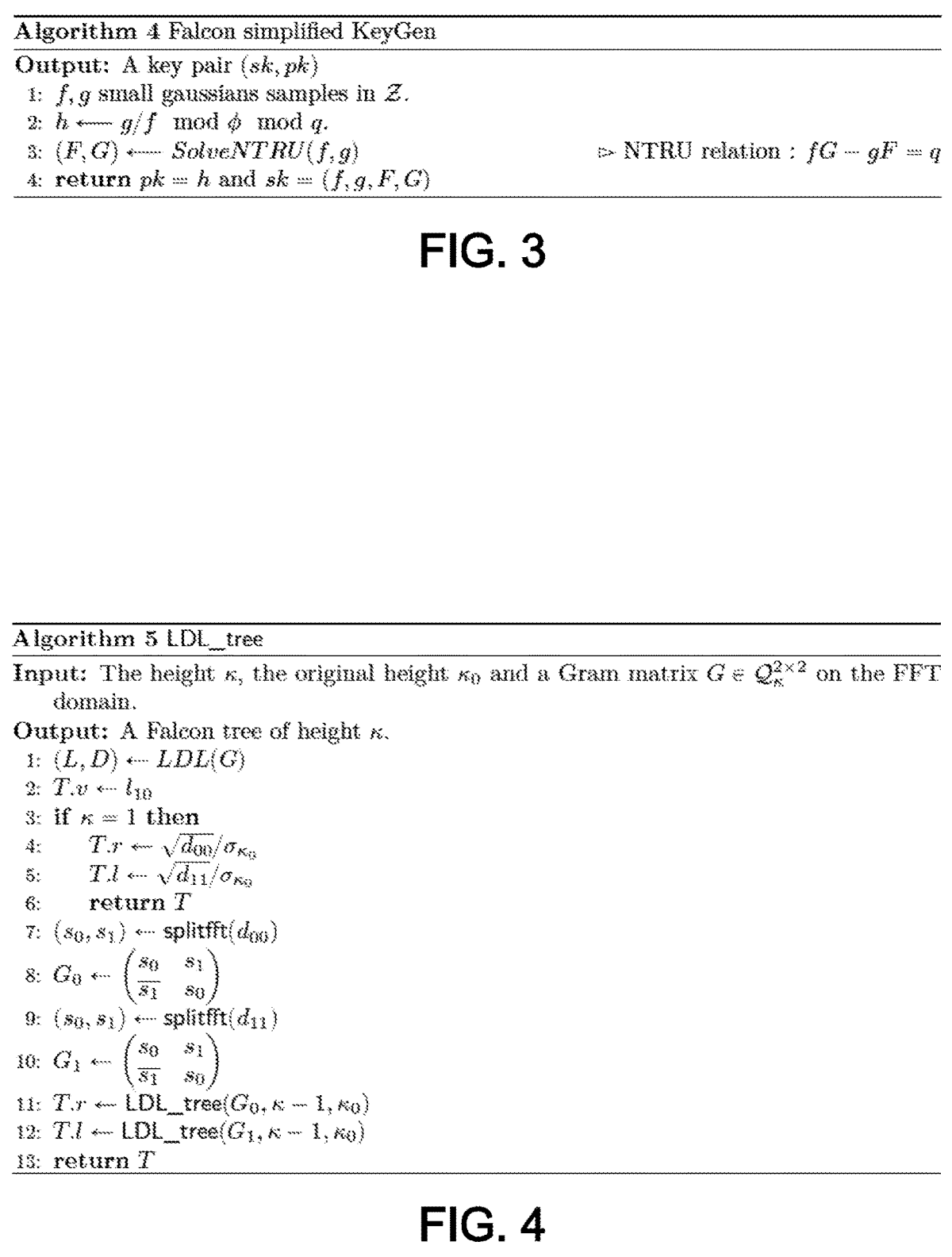

Algorithm 4 Falcon simplified KeyGen

---

Output: A key pair $(sk, pk)$
1: $f, g$ small gaussians samples in $\mathcal{Z}$.
2: $h \longleftarrow g/f \mod \phi \mod q$.
3: $(F, G) \longleftarrow SolveNTRU(f, g)$      $\triangleright$ NTRU relation : $fG - gF = q$
4: return $pk = h$ and $sk = (f, g, F, G)$

Algorithm 5 LDL_tree

---

Input: The height $\kappa$, the original height $\kappa_0$ and a Gram matrix $G \in Q_\kappa^{2 \times 2}$ on the FFT domain.

Output: A Falcon tree of height $\kappa$.
1: $(L, D) \leftarrow LDL(G)$
2: $T.v \leftarrow l_{10}$
3: if $\kappa = 1$ then
4:      $T.r \leftarrow \sqrt{d_{00}}/\sigma_{\kappa_0}$
5:      $T.l \leftarrow \sqrt{d_{11}}/\sigma_{\kappa_0}$
6:      return $T$
7: $(s_0, s_1) \leftarrow \mathsf{splitfft}(d_{00})$
8: $G_0 \leftarrow \begin{pmatrix} s_0 & s_1 \\ \overline{s_1} & s_0 \end{pmatrix}$
9: $(s_0, s_1) \leftarrow \mathsf{splitfft}(d_{11})$
10: $G_1 \leftarrow \begin{pmatrix} s_0 & s_1 \\ \overline{s_1} & s_0 \end{pmatrix}$
11: $T.r \leftarrow LDL\_tree(G_0, \kappa - 1, \kappa_0)$
12: $T.l \leftarrow LDL\_tree(G_1, \kappa - 1, \kappa_0)$
13: return $T$

Figures 5, 6A:
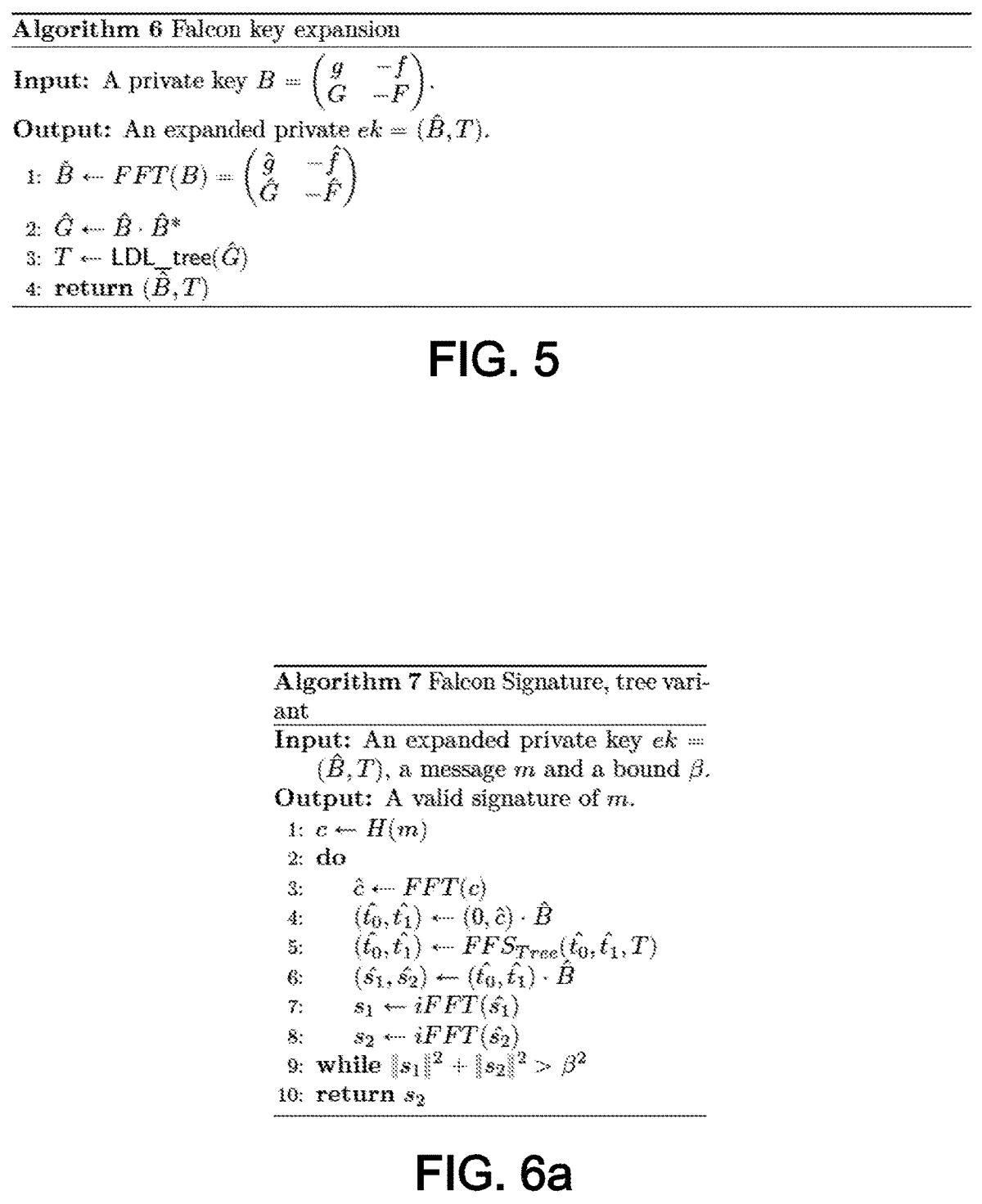

Algorithm 6 Falcon key expansion

---

Input: A private key $B = \begin{pmatrix} g & -f \\ G & -F \end{pmatrix}$.

Output: An expanded private $ek = (\hat{B}, T)$.

1: $\hat{B} \leftarrow FFT(B) = \begin{pmatrix} \hat{g} & -\hat{f} \\ \hat{G} & -\hat{F} \end{pmatrix}$ 2: $\hat{G} \leftarrow \hat{B} \cdot \hat{B}^*$ 3: $T \leftarrow \mathsf{LDL\_tree}(\hat{G})$ 4: return $(\hat{B}, T)$

Algorithm 7 Falcon Signature, tree variant

---

Input: An expanded private key $ek = (\hat{B}, T)$, a message $m$ and a bound $\beta$.

Output: A valid signature of $m$.

1: $c \leftarrow H(m)$
2: do
3:     $\hat{c} \leftarrow FFT(c)$
4:     $(\hat{t}_0, \hat{t}_1) \leftarrow (0, \hat{c}) \cdot \hat{B}$
5:     $(\hat{t}_0, \hat{t}_1) \leftarrow FFS_{Tree}(\hat{t}_0, \hat{t}_1, T)$
6:     $(\hat{s}_1, \hat{s}_2) \leftarrow (\hat{t}_0, \hat{t}_1) \cdot \hat{B}$
7:     $s_1 \leftarrow iFFT(\hat{s}_1)$
8:     $s_2 \leftarrow iFFT(\hat{s}_2)$
9: while $\|s_1\|^2 + \|s_2\|^2 > \beta^2$
10: return $s_2$

Figure 6B:
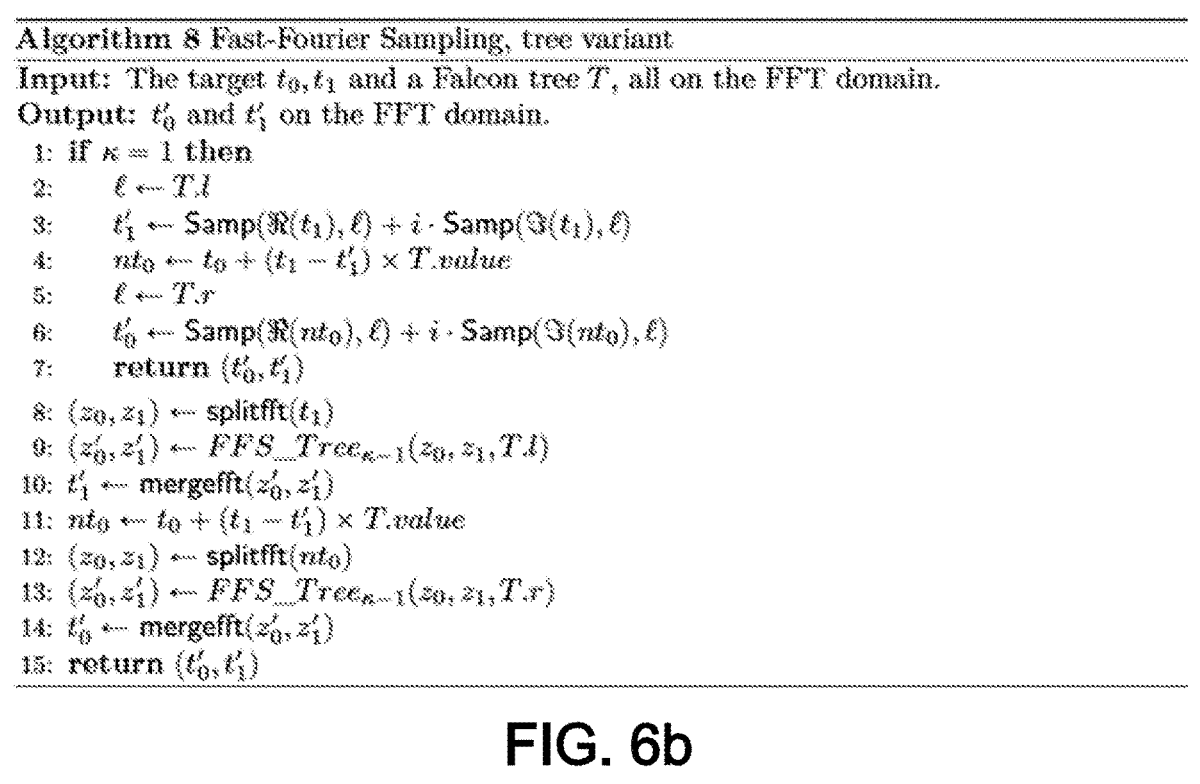

Algorithm 8 Fast-Fourier Sampling, tree variant

Input: The target $t_0, t_1$ and a Falcon tree $T$, all on the FFT domain.

Output: $t_0'$ and $t_1'$ on the FFT domain.

1: if $\kappa = 1$ then
2:     $\ell \leftarrow T.l$
3:     $t_1' \leftarrow \mathsf{Samp}(\Re(t_1), \ell) + i \cdot \mathsf{Samp}(\Im(t_1), \ell)$
4:     $nt_0 \leftarrow t_0 + (t_1 - t_1') \times T.value$
5:     $\ell \leftarrow T.r$
6:     $t_0' \leftarrow \mathsf{Samp}(\Re(nt_0), \ell) + i \cdot \mathsf{Samp}(\Im(nt_0), \ell)$
7:     return $(t_0', t_1')$
8: $(z_0, z_1) \leftarrow \mathsf{splitfft}(t_1)$
9: $(z_0', z_1') \leftarrow FFS\_Tree_{\kappa-1}(z_0, z_1, T.l)$
10: $t_1' \leftarrow \mathsf{mergefft}(z_0', z_1')$
11: $nt_0 \leftarrow t_0 + (t_1 - t_1') \times T.value$
12: $(z_0, z_1) \leftarrow \mathsf{splitfft}(nt_0)$
13: $(z_0', z_1') \leftarrow FFS\_Tree_{\kappa-1}(z_0, z_1, T.r)$
14: $t_0' \leftarrow \mathsf{mergefft}(z_0', z_1')$
15: return $(t_0', t_1')$

Figure 6C:
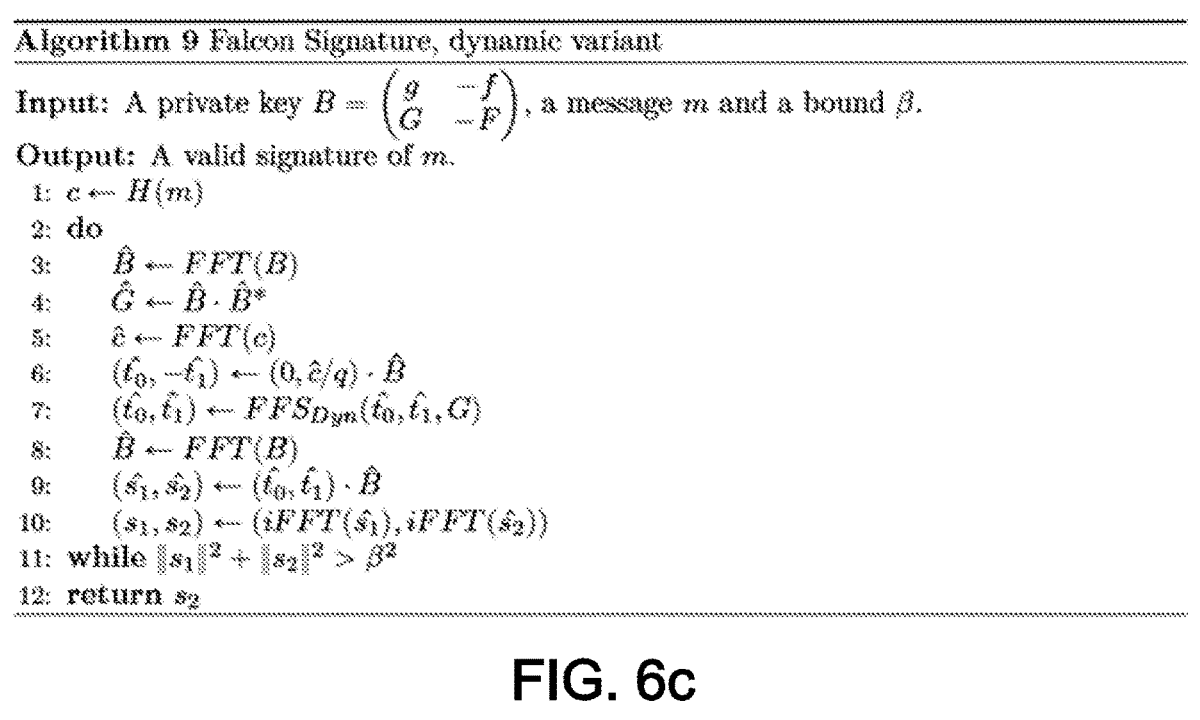

Algorithm 9 Falcon Signature, dynamic variant

Input: A private key $B = \begin{pmatrix} g & -f \\ G & -F \end{pmatrix}$, a message $m$ and a bound $\beta$.

Output: A valid signature of $m$.

1: $c \leftarrow H(m)$
2: do
3:     $\hat{B} \leftarrow FFT(B)$
4:     $\hat{G} \leftarrow \hat{B} \cdot \hat{B}^*$
5:     $\hat{c} \leftarrow FFT(c)$
6:     $(\hat{t}_0, -\hat{t}_1) \leftarrow (0, \hat{c}/q) \cdot \hat{B}$
7:     $(\hat{t}_0, \hat{t}_1) \leftarrow FFS_{Dyn}(\hat{t}_0, \hat{t}_1, G)$
8:     $\hat{B} \leftarrow FFT(B)$
9:     $(\hat{s}_1, \hat{s}_2) \leftarrow (\hat{t}_0, \hat{t}_1) \cdot \hat{B}$
10:     $(s_1, s_2) \leftarrow (iFFT(\hat{s}_1), iFFT(\hat{s}_2))$
11: while $\|s_1\|^2 + \|s_2\|^2 > \beta^2$
12: return $s_2$

Figure 7A:
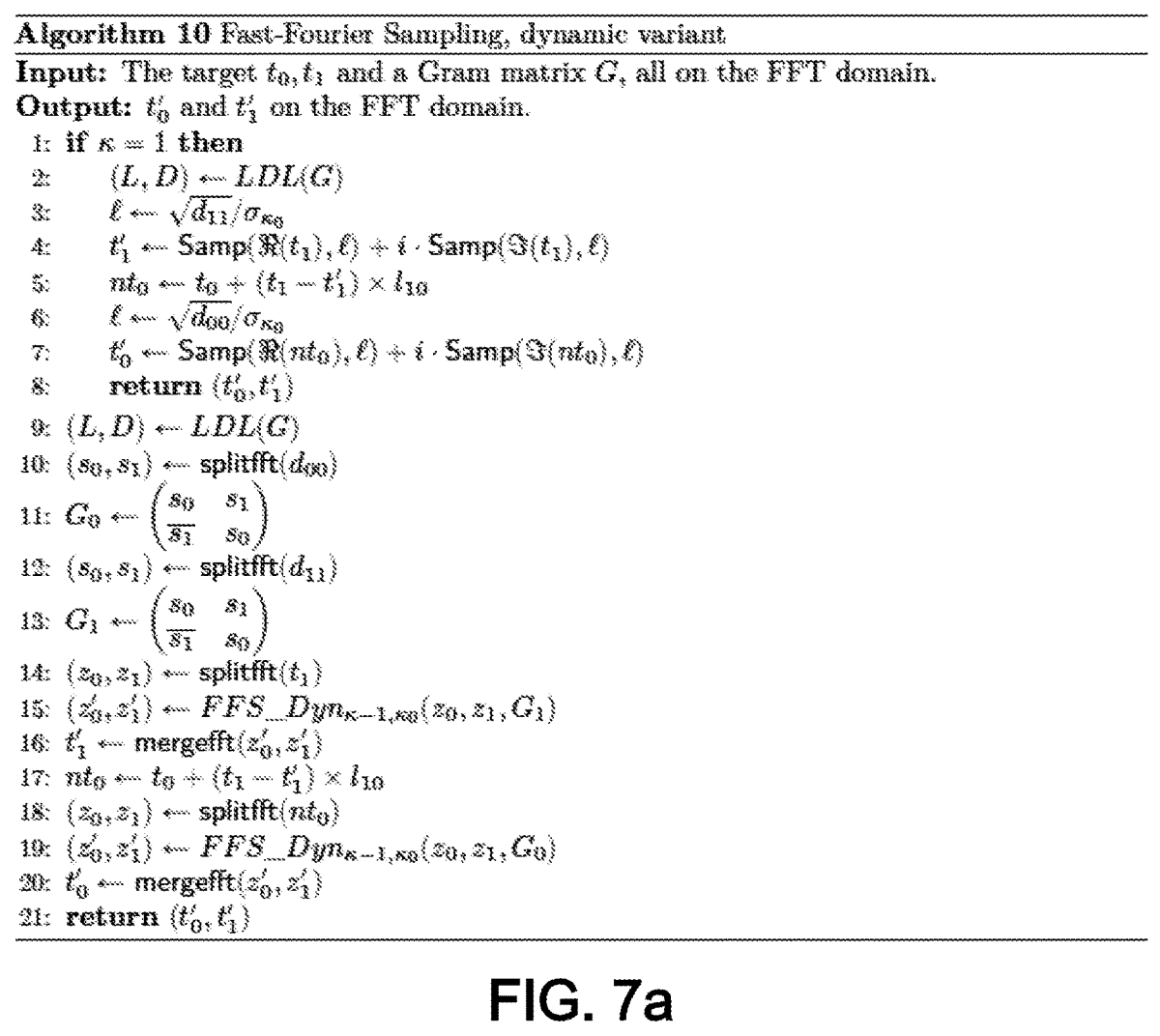

Algorithm 10 Fast-Fourier Sampling, dynamic variant

Input: The target $t_0, t_1$ and a Gram matrix $G$, all on the FFT domain.

Output: $t'_0$ and $t'_1$ on the FFT domain.

1: if $\kappa = 1$ then
2:     $(L, D) \leftarrow LDL(G)$
3:     $\ell \leftarrow \sqrt{d_{11}}/\sigma_{\kappa_0}$
4:     $t'_1 \leftarrow \mathrm{Samp}(\Re(t_1), \ell) + i \cdot \mathrm{Samp}(\Im(t_1), \ell)$
5:     $nt_0 \leftarrow t_0 + (t_1 - t'_1) \times l_{10}$
6:     $\ell \leftarrow \sqrt{d_{00}}/\sigma_{\kappa_0}$
7:     $t'_0 \leftarrow \mathrm{Samp}(\Re(nt_0), \ell) + i \cdot \mathrm{Samp}(\Im(nt_0), \ell)$
8:     return $(t'_0, t'_1)$
9: $(L, D) \leftarrow LDL(G)$
10: $(s_0, s_1) \leftarrow \mathrm{splitfft}(d_{00})$
11: $G_0 \leftarrow \begin{pmatrix} s_0 & s_1 \\ \overline{s_1} & s_0 \end{pmatrix}$
12: $(s_0, s_1) \leftarrow \mathrm{splitfft}(d_{11})$
13: $G_1 \leftarrow \begin{pmatrix} s_0 & s_1 \\ \overline{s_1} & s_0 \end{pmatrix}$
14: $(z_0, z_1) \leftarrow \mathrm{splitfft}(t_1)$
15: $(z'_0, z'_1) \leftarrow FFS\_Dyn_{\kappa-1,\kappa_0}(z_0, z_1, G_1)$
16: $t'_1 \leftarrow \mathrm{mergefft}(z'_0, z'_1)$
17: $nt_0 \leftarrow t_0 + (t_1 - t'_1) \times l_{10}$
18: $(z_0, z_1) \leftarrow \mathrm{splitfft}(nt_0)$
19: $(z'_0, z'_1) \leftarrow FFS\_Dyn_{\kappa-1,\kappa_0}(z_0, z_1, G_0)$
20: $t'_0 \leftarrow \mathrm{mergefft}(z'_0, z'_1)$
21: return $(t'_0, t'_1)$

Figures 8, 9A:
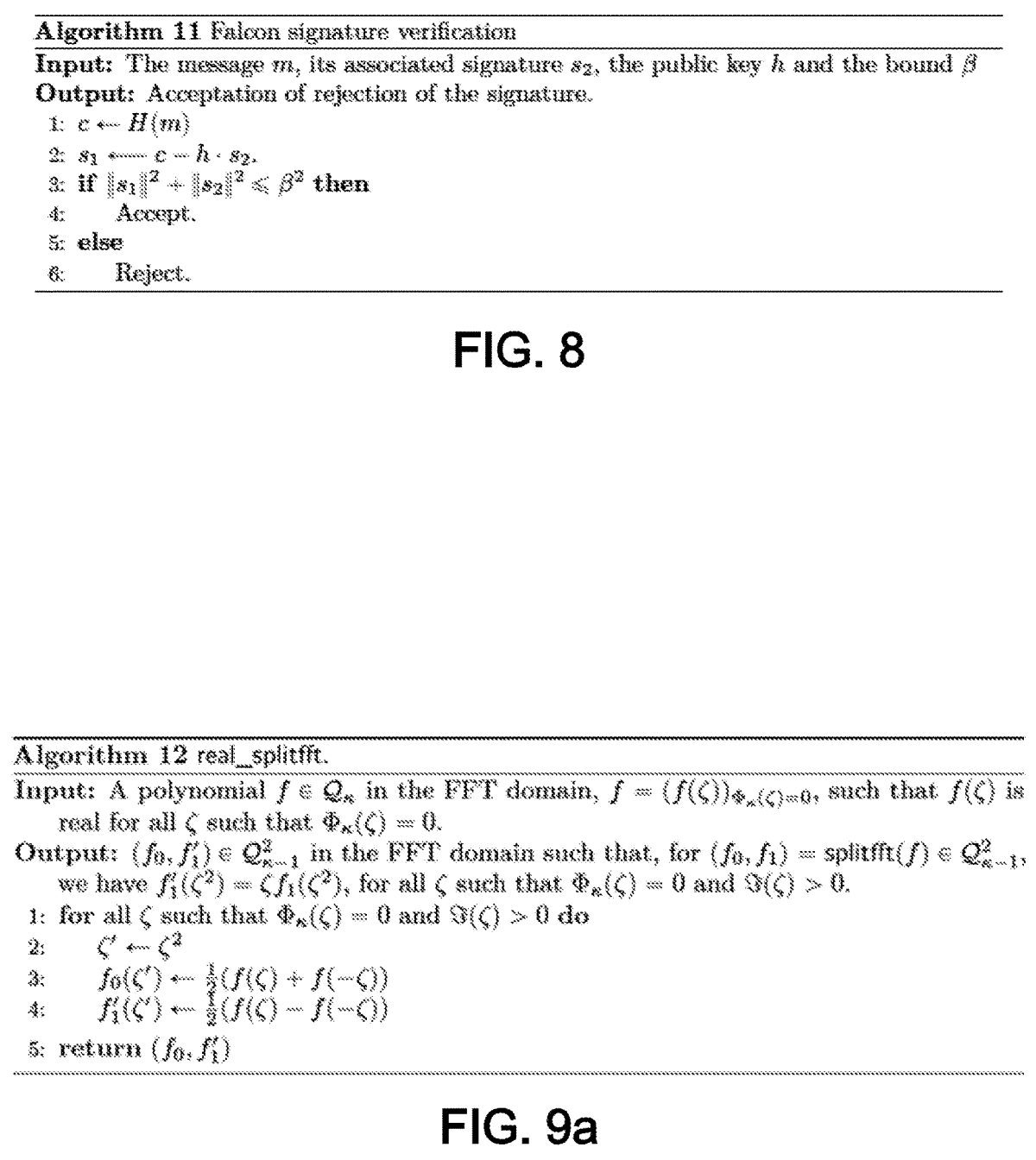

Algorithm 11 Falcon signature verification

Input: The message $m$, its associated signature $s_2$, the public key $h$ and the bound $\beta$

Output: Acceptation of rejection of the signature.

1: $c \leftarrow H(m)$
2: $s_1 \longleftarrow c - h \cdot s_2$.
3: if $\|s_1\|^2 + \|s_2\|^2 \leqslant \beta^2$ then
4:     Accept.
5: else
6:     Reject.

Algorithm 12 real_splitfft.

Input: A polynomial $f \in Q_\kappa$ in the FFT domain, $f = (f(\zeta))_{\Phi_\kappa(\zeta)=0}$, such that $f(\zeta)$ is real for all $\zeta$ such that $\Phi_\kappa(\zeta) = 0$.

Output: $(f_0, f_1) \in Q^2_{\kappa-1}$ in the FFT domain such that, for $(f_0, f_1) = \text{splitfft}(f) \in Q^2_{\kappa-1}$, we have $f_1(\zeta^2) = \zeta f_1(\zeta^2)$, for all $\zeta$ such that $\Phi_\kappa(\zeta) = 0$ and $\Im(\zeta) > 0$.

1: for all $\zeta$ such that $\Phi_\kappa(\zeta) = 0$ and $\Im(\zeta) > 0$ do
2:     $\zeta' \leftarrow \zeta^2$
3:     $f_0(\zeta') \leftarrow \frac{1}{2}(f(\zeta) + f(-\zeta))$
4:     $f_1(\zeta') \leftarrow \frac{1}{2}(f(\zeta) - f(-\zeta))$
5: return $(f_0, f_1)$

Figure 9B:
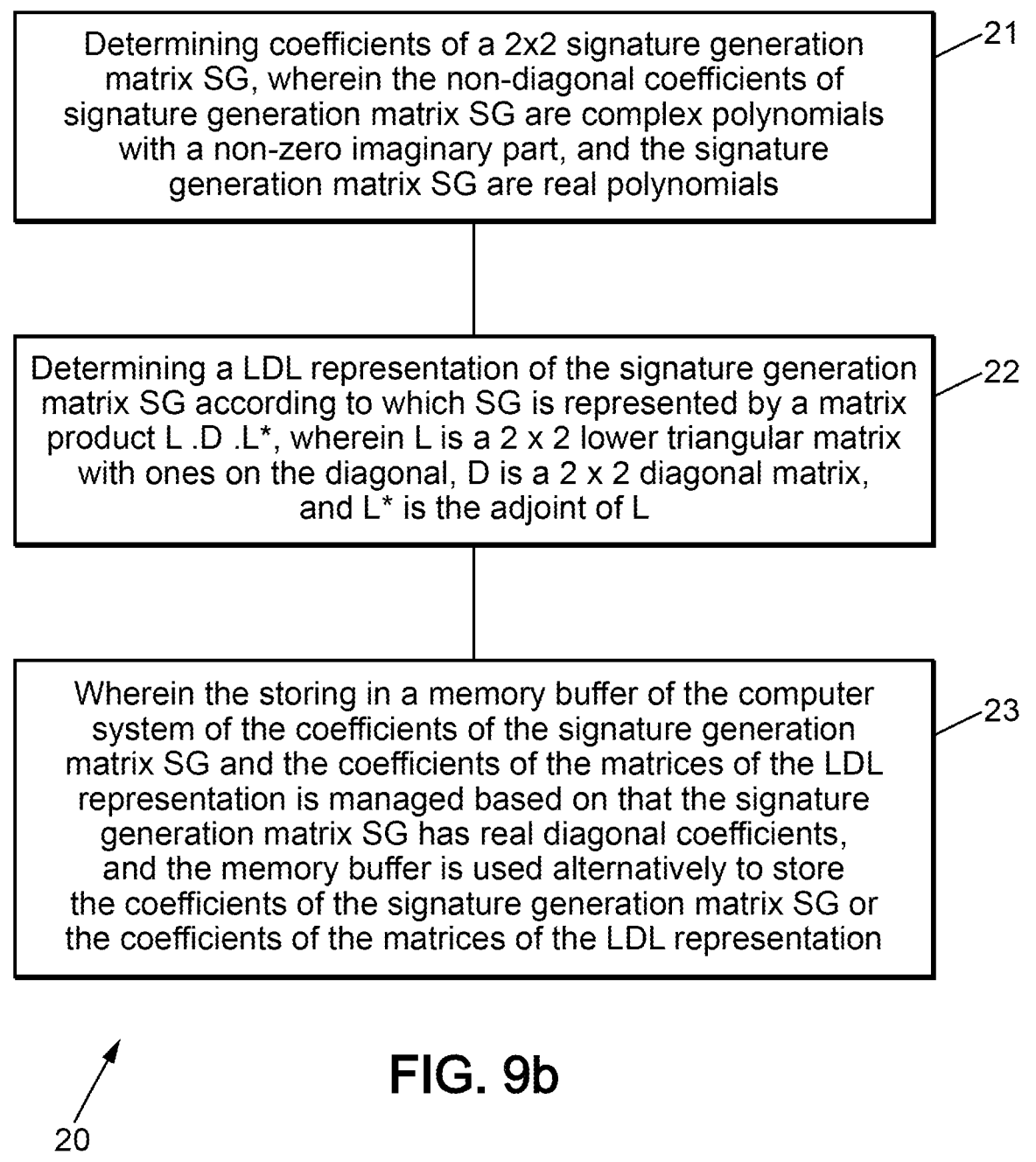

Determining coefficients of a 2x2 signature generation matrix SG, wherein the non-diagonal coefficients of signature generation matrix SG are complex polynomials with a non-zero imaginary part, and the signature generation matrix SG are real polynomials ⟋21

Determining a LDL representation of the signature generation matrix SG according to which SG is represented by a matrix product L .D .L*, wherein L is a 2 x 2 lower triangular matrix with ones on the diagonal, D is a 2 x 2 diagonal matrix, and L* is the adjoint of L ⟋22

Wherein the storing in a memory buffer of the computer system of the coefficients of the signature generation matrix SG and the coefficients of the matrices of the LDL representation is managed based on that the signature generation matrix SG has real diagonal coefficients, and the memory buffer is used alternatively to store the coefficients of the signature generation matrix SG or the coefficients of the matrices of the LDL representation ⟋23

MEMORY MANAGEMENT IN A COMPUTER SYSTEM CONFIGURED FOR GENERATING A SIGNATURE AND APPARATUS FOR IMPLEMENTING THE SAME

CROSS-REFERENCE TO RELATED APPLICATIONS

This application claims priority benefit under 35 U.S.C. § 119(d) from European Patent Application No. 22 306 500.4, filed Oct. 6, 2022, the disclosure of which is incorporated by reference herein in its entirety.

FIELD

The present subject disclosure relates to the field of post-quantum cryptography, in particular to the management of memory space used for implementing a signature generation algorithm.

BACKGROUND

With the worldwide efforts to develop quantum computer, the so-called post-quantum cryptography (PQC) has become a subject of the utmost importance. To prepare a smooth transition from nowadays cryptography to this new paradigm, the NIST started a standardization process for Key Encapsulation Mechanism and Digital Signature in 2017 with the goal of selecting PQC algorithms suitable for real-world deployment.

Among all the candidates, lattice-based propositions appear as the best trade-off between computational and bandwidth efficiency. Both lattice-based signatures achieve reasonable public key and signature sizes, but the most compact is the so-called "Falcon" ("Fast-Fourier Lattice-based Compact Signatures over NTRU") cryptographic signature algorithm. A detailed description of the Falcon algorithm can be found in the paper entitled "FALCON Fast-Fourier Lattice-based Compact Signatures over NTRU" available at the URL https://falcon-sign.info/.

The Falcon design is considered the most size-efficient and it has been shown that its verification algorithm fits in 8 KB of RAM. However, the memory footprint to perform the signature is an order of magnitude larger. While this might not be a problem for many platforms where large areas of memory are cheaply available, it can become a problem when the cryptosystem is deployed on constrained devices where the memory is an expensive resource.

SUMMARY

There is therefore a need for an improved method for managing the memory used for generating a signature of a binary data message m using a key B of a predetermined lattice-based structure that addresses the drawbacks and shortcomings of the conventional technology in the art.

In particular, it is an object of the present subject disclosure to provide an improved method for memory management in a computer system configured for generating a signature of a binary data message m using a key B of a predetermined lattice-based structure that addresses the drawbacks and shortcomings of the conventional technology in the art.

To achieve these objects and other advantages and in accordance with the purpose of the present subject disclosure, as embodied and broadly described herein, in one aspect of the present subject disclosure, a computer-implemented method for memory management in a computer system configured for generating a signature of a binary data message m using a key B of a predetermined lattice-based structure is proposed.

The proposed method may comprise: determining, based on the key B, the coefficients of a 2×2 signature generation matrix SG, wherein the non-diagonal coefficients of the signature generation matrix SG are complex polynomials with a non-zero imaginary part, and the diagonal coefficients of the signature generation matrix SG are real polynomials; determining a LDL representation of the signature generation matrix SG according to which SG is represented by a matrix product L.D.L*, wherein L is a 2×2 lower triangular matrix with ones on the diagonal, D is a 2×2 diagonal matrix, and L* is the adjoint of L; and managing the storing in a memory buffer of the computer system of the coefficients of the signature generation matrix SG and the coefficients of the matrices of the LDL representation based on that (a) the signature generation matrix SG has real diagonal coefficients, and/or (b) the memory buffer is used alternatively to store the coefficients of the signature generation matrix SG or the coefficients of the matrix D of the LDL representation.

In some embodiments, the proposed method may comprise: determining, based on the key B, the coefficients of a 2×2 signature generation matrix SG, wherein the non-diagonal coefficients of the signature generation matrix SG are complex polynomials with a non-zero imaginary part, and the diagonal coefficients of the signature generation matrix SG are real polynomials; determining a LDL representation of the signature generation matrix SG according to which SG is represented by a matrix product L.D.L*, wherein L is a 2×2 lower triangular matrix with ones on the diagonal, D is a 2×2 diagonal matrix, and L* is the adjoint of L; and managing the storing in a memory buffer of the computer system of the coefficients of the signature generation matrix SG and the coefficients of the matrices of the LDL representation based on at least one of: (a) the signature generation matrix SG has real diagonal coefficients, and (b) the memory buffer is used alternatively to store the coefficients of the signature generation matrix SG or the coefficients of the matrix D of the LDL representation.

In some embodiments, the proposed method may comprise: determining, based on the key B, the coefficients of a 2×2 signature generation matrix SG, wherein the non-diagonal coefficients of the signature generation matrix SG are complex polynomials with a non-zero imaginary part, and the diagonal coefficients of the signature generation matrix SG are real polynomials; determining a LDL representation of the signature generation matrix SG according to which SG is represented by a matrix product L.D.L*, wherein L is a 2×2 lower triangular matrix with ones on the diagonal, D is a 2×2 diagonal matrix, and L* is the adjoint of L; and managing the storing in a memory buffer of the computer system of the coefficients of the signature generation matrix SG and the coefficients of the matrices of the LDL representation based on that the signature generation matrix SG has real diagonal coefficients.

In some embodiments, the proposed method may comprise: determining, based on the key B, the coefficients of a 2×2 signature generation matrix SG, wherein the non-diagonal coefficients of the signature generation matrix SG are complex polynomials with a non-zero imaginary part, and the diagonal coefficients of the signature generation matrix SG are real polynomials; determining a LDL representation of the signature generation matrix SG according to which SG is represented by a matrix product L.D.L*, wherein L is a 2×2 lower triangular matrix with ones on the diagonal, D is a 2×2 diagonal matrix, and L* is the adjoint of L; and managing the storing in a memory buffer of the computer system of the coefficients of the signature generation matrix SG and the coefficients of the matrices of the LDL representation based on that the memory buffer is used alternatively to store the coefficients of the signature generation matrix SG or the coefficients of the matrix D of the LDL representation.

In some embodiments, the proposed method may comprise: determining, based on the key B, the coefficients of a 2×2 signature generation matrix SG, wherein the non-diagonal coefficients of the signature generation matrix SG are complex polynomials with a non-zero imaginary part, and the diagonal coefficients of the signature generation matrix SG are real polynomials; determining a LDL representation of the signature generation matrix SG according to which SG is represented by a matrix product L.D.L*, wherein L is a 2×2 lower triangular matrix with ones on the diagonal, D is a 2×2 diagonal matrix, and L* is the adjoint of L; and managing the storing in a memory buffer of the computer system of the coefficients of the signature generation matrix SG and the coefficients of the matrices of the LDL representation by using the memory buffer alternatively to store the coefficients of the signature generation matrix SG or the coefficients of the matrix D of the LDL representation.

In one or more embodiments, the memory buffer is dimensioned for storing complex non-diagonal coefficients and real diagonal coefficients of the signature generation matrix SG. In some embodiments, the memory buffer may be limited in size to what is required for storing complex non-diagonal coefficients and real diagonal coefficients of the signature generation matrix SG. This advantageously reduces the size of the memory space required for implementing a signature algorithm such as according to the Falcon scheme, thereby allowing implementations on embedded systems with very limited memory space.

In one or more embodiments, the diagonal matrix $$D = \begin{pmatrix} d_{00} & 0 \\ 0 & d_{11} \end{pmatrix}$$

may be determined as:

$$\begin{pmatrix} g_{00} & 0 \\ 0 & g_{11} - \dfrac{|g_{01}|^2}{g_{00}} \end{pmatrix},$$

where the signature generation matrix $$SG = \begin{pmatrix} g_{00} & g_{01} \\ g_{10} & g_{11} \end{pmatrix},$$

where $g_{00}$ and $g_{11}$ are real polynomials, and $g_{10}$ and $g_{01}$ are complex polynomials.

In one or more embodiments, the key B may have a matrix structure, and the signature generation matrix may further be determined based on the matrix product B.B*, wherein B* is the adjoint matrix of B.

In one or more embodiments, the key B may have a matrix structure, and the signature generation matrix may be determined based on the matrix product $\hat{B}.\hat{B}^*$, wherein $\hat{B}^*$ is the adjoint matrix of $\hat{B}$, and wherein $\hat{B}$ is obtained based on a transform of the matrix B in a frequency domain.

In one or more embodiments, the matrix L may be of the form $$\begin{pmatrix} 1 & 0 \\ l_{10} & 1 \end{pmatrix},$$

and the proposed method may further comprise: computing the coefficient $l_{10}$ of the matrix L as $$l_{10} = \frac{\overline{g_{01}}}{g_{00}},$$

wherein the signature generation matrix SG is of the form $$\begin{pmatrix} g_{00} & g_{01} \\ g_{10} & g_{11} \end{pmatrix},$$

where $g_{00}$ and $g_{11}$ are real polynomials, and $g_{10}$ and $g_{01}$ are complex polynomials, and wherein the computing the coefficient $l_{10}$ of the matrix L comprises: computing the inverse $1/g_{00}$ of the real coefficient $g_{00}$, and performing a real-complex multiplication of $1/g_{00}$ with the complex polynomial $\overline{g_{01}}$.

In one or more embodiments, the signature generation matrix SG may be determined to be of the form:

$$\begin{pmatrix} g_{00} & g_{01} \\ \overline{g_{01}} & g_{00} \end{pmatrix},$$

wherein $g_{00}$ is a real polynomial, $g_{01}$ is a complex polynomial, and $\overline{g_{01}}$ is the complex conjugate of $g_{01}$. Further, the memory buffer may be dimensioned for storing $g_{00}$ and the real and imaginary parts of $g_{01}$. In some embodiments, the memory buffer may be limited in size to what is required for storing $g_{00}$ and the real and imaginary parts of $g_{01}$. This also advantageously reduces the size of the memory space required for implementing a signature algorithm such as according to the Falcon scheme, thereby allowing implementations on embedded systems with very limited memory space.

In one or more embodiments, the signature generation matrix may be a Gram matrix of size 2×2.

In one or more embodiments, the signature generation matrix SG may be of the form $$\begin{pmatrix} g_{00} & g_{01} \\ g_{10} & g_{11} \end{pmatrix},$$

where $g_{00}$ and $g_{11}$ are real polynomials, and $g_{10}$ and $g_{01}$ are complex polynomials, wherein $g_{10}$ is equal to the complex conjugate $\overline{g_{10}}$ of $g_{01}$. Further, the memory buffer may be dimensioned to store real polynomials corresponding to $g_{00}$, $g_{11}$, and the real and imaginary parts of $g_{01}$. The diagonal matrix $$D = \begin{pmatrix} d_{00} & 0 \\ 0 & d_{11} \end{pmatrix}$$

may be determined as:

$$\begin{pmatrix} g_{00} & 0 \\ 0 & g_{11} - \dfrac{|g_{01}|^2}{g_{00}} \end{pmatrix},$$

and the coefficient $d_{11}$ may be stored in the memory buffer by overwriting one or more coefficients of the signature generation matrix SG. In some embodiments, the memory buffer may be limited in size to what is required for storing $g_{00}$ and the real and imaginary parts of $g_{01}$, and the same memory buffer may advantageously be used for storing the coefficient $d_{11}$ by overwriting one or more coefficients of the signature generation matrix SG. This also advantageously further reduces the size of the memory space required for implementing a signature algorithm such as according to the Falcon scheme, thereby allowing implementations on embedded systems with very limited memory space.

In one or more embodiments, the proposed method may further comprise: generating a signature $s_2$ of the message m based on the determination of the coefficients of the signature generation matrix SG, and the determination of the LDL representation of the signature generation matrix SG.

In one or more embodiments, the key B may be of the form $$\begin{pmatrix} g & -f \\ G & -F \end{pmatrix},$$

wherein f, g, F, and G are polynomials of $\mathbb{Q}[x]/\Phi_\kappa$), where $\Phi_\kappa = x^n + 1 \in \mathbb{Z}[x]$ for $n = 2^\kappa$, and $\kappa$ be a positive integer which verify the equation $f \cdot G - g \cdot F = q \mod(\Phi_\kappa)$, where q is a constant equal to $12 \times 2^{10} + 1$ (that is, $q = 12289$).

According to another aspect of the present subject disclosure, an apparatus (e.g. a processing node in a computer system) is proposed, which comprises a processor, and a memory operatively coupled to the processor. The proposed apparatus is configured to perform embodiments of the proposed method according to the present subject disclosure.

According to yet another aspect of the present subject disclosure, a non-transitory computer-readable medium encoded with executable instructions which, when executed on a computer, causes a processor of the non-quantum computer, that is operatively coupled with a memory, to perform embodiments of the proposed method according to the present subject disclosure, is proposed.

For example, in embodiments, the present subject disclosure provides a non-transitory computer-readable medium encoded with executable instructions which, when executed, causes an apparatus comprising a processor operatively coupled with a memory, to manage memory in a computer system configured for generating a signature of a binary data message m using a key B of a predetermined lattice-based structure, by performing the determining, by the processor, based on the key B, the coefficients of a 2×2 signature generation matrix SG, wherein the non-diagonal coefficients of the signature generation matrix SG are complex polynomials with a non-zero imaginary part, and the diagonal coefficients of the signature generation matrix SG are real polynomials; determining, by the processor, a LDL representation of the signature generation matrix SG according to which SG is represented by a matrix product L.D.L*, wherein L is a 2×2 lower triangular matrix with ones on the diagonal, D is a 2×2 diagonal matrix, and L* is the adjoint of L; and managing, by the processor, the storing in a memory buffer of the computer system of the coefficients of the signature generation matrix SG and the coefficients of the matrices of the LDL representation based on at least one of: (a) the signature generation matrix SG has real diagonal coefficients, and (b) the memory buffer is used alternatively to store the coefficients of the signature generation matrix SG or the coefficients of the matrix D of the LDL representation.

According to yet another aspect of the present subject disclosure, a computer program product comprising computer program code tangibly embodied in a computer readable medium, said computer program code comprising instructions to, when provided to a computer system and executed, cause said computer system to perform embodiments of the proposed method according to the present subject disclosure, is proposed.

In another aspect of the present subject disclosure, a data set representing, for example through compression or encoding, a computer program as proposed herein, is proposed.

It should be appreciated that the present subject disclosure can be implemented and utilized in numerous ways, including without limitation as a process, an apparatus, a system, a device, and as a method for applications now known and later developed. These and other unique features of the system disclosed herein will become more readily apparent from the following description and the accompanying drawings.

BRIEF DESCRIPTION OF THE DRAWINGS

The present subject disclosure will be better understood and its numerous objects and advantages will become more apparent to those skilled in the art by reference to the following drawings, in conjunction with the accompanying specification, in which:

FIG. 1 illustrates an exemplary algorithm for computing a Fast Fourier Transform of a polynomial according to the Falcon signature scheme, in accordance with one or more embodiments;

FIG. 2a illustrates an exemplary algorithm for computing a split of a polynomial into two polynomials according to the Falcon signature scheme, in accordance with one or more embodiments;

FIG. 2b illustrates an exemplary algorithm for computing a merge of two or more polynomials into one polynomial according to the Falcon signature scheme, in accordance with one or more embodiments;

FIG. 3 illustrates an exemplary algorithm for generating keys according to the Falcon signature scheme, in accordance with one or more embodiments;

FIG. 4 illustrates an exemplary algorithm for computing a "Falcon tree" according to the Falcon signature scheme, in accordance with one or more embodiments;

FIG. 5 illustrates an exemplary algorithm for key expansion according to the Falcon signature scheme, in accordance with one or more embodiments;

FIG. 6a illustrates an exemplary algorithm for message signature according to the "tree variant" of the Falcon signature scheme, in accordance with one or more embodiments;

FIG. 6b illustrates an exemplary algorithm for fast Fourier sampling (tree variant) according to the Falcon signature scheme, in accordance with one or more embodiments.

FIG. 6*c* illustrates an exemplary algorithm for message signature according to the "dynamic variant" of the Falcon signature scheme, in accordance with one or more embodiments;

FIG. 7*a* illustrates an exemplary algorithm for fast Fourier sampling (dynamic variant) according to the Falcon signature scheme, in accordance with one or more embodiments.

FIG. 8 illustrates an exemplary algorithm for signature verification according to the Falcon signature scheme, in accordance with one or more embodiments.

FIG. 9*a* illustrates an exemplary algorithm for computing a split of a real polynomial into two real polynomials, in accordance with one or more embodiments;

FIG. 9*b* is a block diagram illustrating an exemplary memory management method, in accordance with one or more embodiments;

DETAILED DESCRIPTION

Figure 7B:
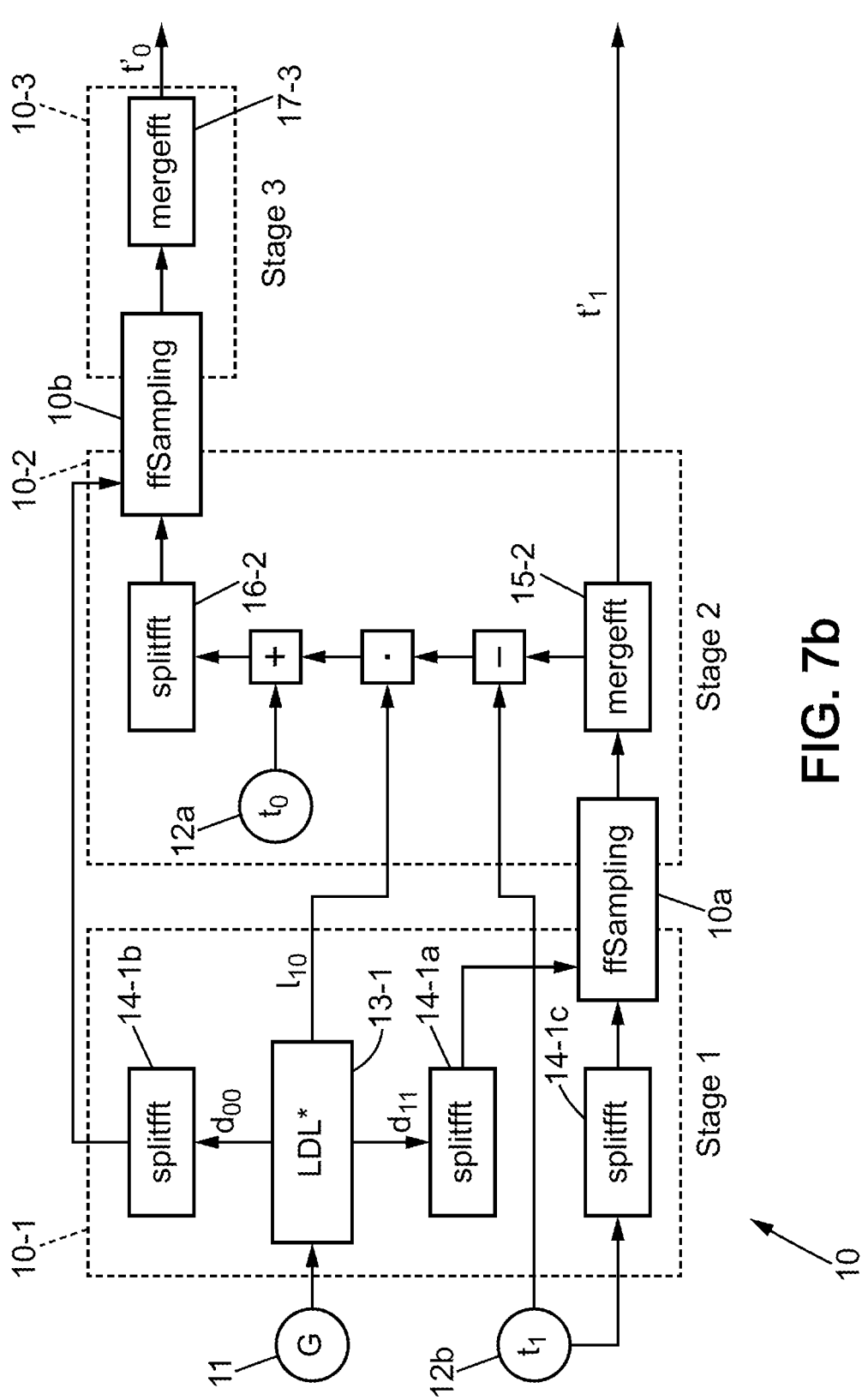
FIG. 7*b* is a flowchart illustrating an exemplary algorithm for fast Fourier sampling (dynamic variant) according to the Falcon signature scheme, in accordance with one or more embodiments.

The advantages, and other features of the components disclosed herein, will become more readily apparent to those having ordinary skill in the art form. The following detailed description of certain preferred embodiments, taken in conjunction with the drawings, sets forth representative embodiments of the subject technology, wherein like reference numerals identify similar structural elements.

For simplicity and clarity of illustration, the drawing figures illustrate the general manner of construction, and descriptions and details of well-known features and techniques may be omitted to avoid unnecessarily obscuring the discussion of the described embodiments of the subject disclosure. Additionally, elements in the drawing figures are not necessarily drawn to scale. For example, the dimensions of some of the elements in the figures may be exaggerated relative to other elements to help improve understanding of embodiments of the present subject disclosure. Certain figures may be shown in an idealized fashion in order to aid understanding, such as when structures are shown having straight lines, sharp angles, and/or parallel planes or the like that under real-world conditions would likely be significantly less symmetric and orderly.

In addition, it should be apparent that the teaching herein can be embodied in a wide variety of forms and that any specific structure and/or function disclosed herein is merely representative. In particular, one skilled in the art will appreciate that an aspect disclosed herein can be implemented independently of any other aspects and that several aspects can be combined in various ways.

The present disclosure is described below with reference to functions, engines, block diagrams and flowchart illustrations of the methods, systems, and computer program according to one or more exemplary embodiments. Each described function, engine, block of the block diagrams and flowchart illustrations can be implemented in hardware, software, firmware, middleware, microcode, or any suitable combination thereof. If implemented in software, the functions, engines, blocks of the block diagrams and/or flowchart illustrations can be implemented by computer program instructions or software code, which may be stored or transmitted over a computer-readable medium, or loaded onto a general purpose non quantum computer, special purpose non quantum computer or other programmable data processing apparatus to produce a machine, such that the computer program instructions or software code which execute on the non-quantum computer or other programmable data processing apparatus, create the means for implementing the functions described herein.

Embodiments of computer-readable media includes, but are not limited to, both computer storage media and communication media including any medium that facilitates transfer of a computer program from one place to another. As used herein, a "computer storage media" may be any physical media that can be accessed by a computer. Examples of computer storage media include, but are not limited to, a flash drive or other flash memory devices (e.g. memory keys, memory sticks, key drive), CD-ROM or other optical storage, DVD, magnetic disk storage or other magnetic storage devices, memory chip, RAM, ROM, EEPROM, smart cards, Solid State Drive (SSD) devices or Hard Disk Drive (HDD) devices, or any other suitable medium from that can be used to carry or store program code in the form of instructions or data structures which can be read by a computer processor. Also, various forms of computer-readable media may transmit or carry instructions to a computer, including a router, gateway, server, or other transmission device, wired (coaxial cable, fiber, twisted pair, DSL cable) or wireless (infrared, radio, cellular, microwave). The instructions may comprise code from any computer-programming language, including, but not limited to, assembly, C, C++, Visual Basic, HTML, PHP, Java, Javascript, Python, and bash scripting.

Unless specifically stated otherwise, it will be appreciated that throughout the following description discussions utilizing terms such as processing, computing, calculating, determining, generating, or the like, refer to the action or processes of a computer or computing system, or similar electronic computing device, that manipulate or transform data represented as physical, such as electronic, quantities within the registers or memories of the computing system into other data similarly represented as physical quantities within the memories, registers or other such information storage, transmission or display devices of the computing system.

The terms "comprise," "include," "have," and any variations thereof, are intended to cover a non-exclusive inclusion, such that a process, method, article, or apparatus that comprises a list of elements is not necessarily limited to those elements but may include other elements not expressly listed or inherent to such process, method, article, or apparatus.

Additionally, the word "exemplary" as used herein means serving as an example, instance, or illustration. Any aspect or design described herein as "exemplary" is not necessarily to be construed as preferred or advantageous over other aspects or designs.

In the following description and claims, the notation "|0>" designates the quantum state "ket-zero" that may be used as an initial quantum state in embodiments of the present subject disclosure.

In the following, a description of the Falcon signature scheme, including some of the algorithms specified for Falcon is provided. Further details on Falcon, including on the algorithms illustrated by FIGS. 1, 2*a*, 2*b*, 3, 4, 5, 6*a*, 6*b*, and 7, may be found in the document "FALCON: Fast-Fourier Lattice-based Compact Signatures over NTRU Specifications v1.0", which is available at the following URL: https://www.di.ens.fr/~prest/Publications/falcon.pdf.

In the following, embodiments of the proposed methods, apparatuses and computer programs are described in the exemplary context of the Falcon signature scheme. The methods proposed in the present subject disclosure may be implemented by any computer system comprising a processor configured for generating a signature of a binary data message m, such as, for example a computer system configured for implementing a signature scheme compliant with the Falcon specification(s) or any related standard(s), whether in their existing versions and/or their evolutions, as the case may be adapted for implementing one or more embodiments of the proposed methods.

However, it will be appreciated by those having ordinary skill in the relevant art that embodiments provided in the present subject disclosure may be used in any other suitable signature scheme context in place of or in addition to the Falcon signature scheme which is given by way of example only. Further, even though the following focuses on a non-limiting example based on the Falcon specification, a person of ordinary skill in the art would understand that the proposed processes, apparatuses and computer programs of the present subject disclosure may be implemented based on any suitable message signature scheme, and that such proposed processes, apparatuses and computer programs of the present subject disclosure are not limited to the use of any specific signature scheme, and in particular to the Falcon signature scheme, which is provided as an example only.

Falcon is a Lattice-based digital signature scheme relying on the Hash-and-Sign paradigm and more precisely on the so-called "GPV framework" established by Gentry et al. in the paper entitled "Trapdoors for hard lattices and new cryptographic constructions" (Proceedings of the fortieth annual ACM symposium on Theory of computing, pages 197-206, 2008). The main idea of the GPV framework is to have a private and a public basis of the same q-ary lattice. The private basis is used for trapdoor sampling, namely, sampling of lattice vector close to a given target vector, and the public basis is used by the verifier to check if a given vector is indeed a lattice point.

The Falcon procedure to sign a binary data message m includes the following operations: the message m is first hashed to a vector, and a pre-image is computed via basic linear algebra. Then the private basis is used to sample a close lattice point. Finally, the verifier just needs to check if the given signature is small and if it is a lattice point.

To instantiate the GPV framework, Falcon designers chose the NTRU families to favor compactness and to rely on a fast Fourier sampling for the trapdoor function.

Let $\kappa$ be a positive integer. Set $\Phi_\kappa = x^n + 1 \in \mathbb{Z}[x]$ for $n = 2^\kappa$. It is the 2n-th cyclotomic polynomial, whose roots are $$\zeta_{2n}^k$$

with $$\zeta_{2n} = e^{i\pi/n}$$

and k an odd positive integer. Let $Q_\kappa = \mathbb{Q}[x]/(\Phi_\kappa)$ be the 2n-th cyclotomic field. In the following, the parameter $\kappa$ may be omitted when it is clear from context.

For any polynomial $$a = \sum_{i=0}^{n-1} a_i x^i \in Q,$$

we call the "adjoint" of a, noted a*, the unique element of Q such that for any root $\zeta$ or $\Phi$, we have $a^*(\zeta) = \overline{a(\zeta)}$ for the usual complex conjugation. Since $\Phi$ is a cyclotomic polynomial, we have:

$$a^* = a_0 - \sum_{i=1}^{n-1} a_i x^{n-1}.$$

This definition can be extended to vectors and matrices by applying the adjoint component-wise to the transpose of vectors and matrices.

We can now define a metric over Q with the inner product $\langle ., . \rangle$ and its associated norm $\|.\|$, follows: For a, b $\in$ Q, $$\langle a, b \rangle = \sum_{i=0}^{n-1} a_i b_i = \frac{1}{\deg \Phi} \sum_{\Phi(\zeta)=0} a(\zeta) \overline{b(\zeta)}$$

and $$\|a\| = \sqrt{\langle a, a \rangle}.$$

The scalar product definition can be naturally extended to vectors over Q: For u, v $\in Q^l$, $$\langle u, v \rangle =$$

$$\sum_{i=0}^{l-1}$$

$$\Sigma \langle u_i, v_i \rangle$$

Let B be a full rank two-by-two matrix over Q. We can decompose B as a unique matrix product $B = L.\tilde{B}$, where L is a lower triangular matrix with ones on the diagonal, and where distinct rows of $\tilde{B}$ are orthogonal. This decomposition is known as the "Gram-Schmidt decomposition", and we can define the following value:

$$\|B\|_{GS} = \max_{\tilde{B}_i} \|\tilde{B}_i\|$$

However, for efficiency reason, Falcon uses the so-called "LDL decomposition". Let $G = B.B^*$ be the Gram matrix of B. We can write G as a unique matrix product $L.D.L^*$, with L being a lower triangular matrix with ones on the diagonal, and D being a diagonal matrix.

Both decompositions are equivalent. In particular, the L matrices in both decompositions are equal.

In addition, $\|B\|_{GS}$ can be computed from the square root of the coefficients of D.

For $G = \begin{pmatrix} g_{00} & g_{01} \\ g_{10} & g_{11} \end{pmatrix}$, we have $D = \begin{pmatrix} d_{00} & 0 \\ 0 & d_{11} \end{pmatrix} = \begin{pmatrix} g_{00} & 0 \\ 0 & g_{11} - \dfrac{|g_{01}|^2}{g_{00}} \end{pmatrix}$, and $L = \begin{pmatrix} 1 & 0 \\ \dfrac{\overline{g_{01}}}{g_{00}} & 1 \end{pmatrix}$.

The Discrete Fourier Transform is a widely used technique to achieve fast polynomial arithmetic. Indeed, it may be used for linear polynomial addition, multiplication, and division. While the naïve complexity of the transformation is $O(n^2)$, the power-of-two cyclotomic structure of $\Phi$ fortunately allows to use the Fast Fourier Transform introduced by Cooley-Tukey with a quasi-linear complexity of $O(n \log n)$. FIG. 1 illustrates an exemplary iterative description of the Cooley-Tukey FFT. For the sake of simplicity, the exact value of the twiddle factors in line 5 which are precomputed is omitted, and their order are explicated only when needed.

The inverse operation, noted iFFT, and referred to as "inverse Fast Fourier Transform", may be described in a similar manner as the FFT operation, with $\kappa$ ranging from $\kappa_0$ to 1, t ranging from 1 to n, by reverting the butterfly on the innermost loop. One can note that the iFFT algorithm may use the Gentleman-Sande butterfly.

For $f \in Q$, the image of f by the FFT transform may be said as being on the "FFT domain", and may be noted as $\hat{f}$, and conversely the original f may be said as being on the "classical domain". In the following, the notation "^" may be omitted if it is clear from the context that the polynomial is (or is not) on the FFT domain.

The FFT representation of a Q polynomial is redundant since for $f \in Q$, we have $f(\overline{\zeta}) = \overline{f(\zeta)}$. As a consequence, only n/2 complex numbers are needed to store the image $\hat{f}$ by a FFT transform of an original $f \in Q$.

The signing operation of the Falcon scheme may use an operation to split an element of $Q_\kappa$ into two elements of $Q_{\kappa-1}$. The splitting of an element of $Q_\kappa$ may be based on that, by its very definition, $\Phi_\kappa(x) = \Phi_{\kappa-1}(x^2)$.

Conversely, two elements of $\mathbb{Q}[x]/(\Phi_{\kappa-1})$ may be merged into one element of $\mathbb{Q}[x]/(\Phi_\kappa)$.

For example, the split of a polynomial $$f = \sum_{i=0}^{n-1} a_i x^i$$

of $Q_\kappa$ may be obtained by defining two polynomials of $Q_{\kappa-1}$, such that $f(x) = f_0(x^2) + x f_1(x^2)$, as follows:

$$f_0(x) = \sum_{i=0}^{\frac{n}{2}-1} a_{2i} x^i \text{ and } f_1(x) = \sum_{i=0}^{\frac{n}{2}-1} a_{2i+1} x^i$$

In the following, the split of the polynomial f of $Q_\kappa$ is noted $\text{split}(f) = (f_0, f_1)$, and conversely the merge of the two polynomials $f_0$ and $f_1$ into the polynomial f may be noted $f = \text{merge}(f_0, f_1)$.

Once f is on the FFT domain, it costs $O(n \log n)$ to transform it back on the classical domain. Therefore it may be advantageous to compute the split and merge operations in the FFT domain. To do so, a splitfft function defined by splitfft(FFT(f))=FFT(split(f)) and a mergefft function defined by mergefft (FFT($f_0$), FFT($f_1$))=FFT(merge($f_0$, $f_1$)). Examples of algorithms for implementing the splitfft and mergefft functions are provided by the algorithms of FIG. 2a and FIG. 2b, respectively.

The fft algorithm shown on FIG. 1 computes the Fast Fourier Transform f of an input polynomial of degree n.

The splitfft algorithm shown on FIG. 2a splits an input complex polynomial f into two complex polynomials $f_0$ and $f_1$.

The mergefft algorithm shown on FIG. 2b merges two (or more) input polynomials $f_0$ into one polynomial.

We note $Z = \mathbb{Z}[x]/(\Phi)$ the ring of integers of Q and q=12289.

A NTRU family is defined as a quadruplet (f, g, F, G)$\in Z^4$ such that the following NTRU equation holds:

$$fG - gF = q \mod \phi$$

Furthermore, the polynomials f and g may advantageously be chosen "small", and the polynomial f may be chosen to be invertible modulo q so that $h \leftarrow g/f \mod q$ can be computed. Then h can be used as a public key, while the NTRU family can be used as a private key, as it can be checked that $$\begin{pmatrix} 1 & h \\ 0 & q \end{pmatrix} \text{ and } \begin{pmatrix} f & g \\ F & G \end{pmatrix}$$

generate the very same lattice.

The security of the scheme relies on the fact that h and q are large polynomials unsuited for trapdoor sampling. Moreover, it is hard to find small polynomials f' and g' such that h=g'/f'. The hardness of this problem is known as the NTRU assumption.

As provided by the Key Generation scheme of Falcon, the polynomials f and g are first sampled using integer gaussian sampling. Then the scheme checks if f is invertible. In the case where f is invertible, h is computed. Otherwise, in the case where f is not invertible, f and g are rejected and new polynomials are sampled. Finally, the NTRU equation is solved.

However, the NTRU equation does not necessarily have a solution, and the polynomials F and G might be too big to perform trapdoor sampling. In any of those two cases, f and g are rejected and new polynomials are sampled.

An exemplary simplified view of the Falcon Key Generation algorithm is illustrated by FIG. 3.

As explained in the Falcon specification, various algorithms may be considered for the Trapdoor sampler, as four propositions were present in the literature when Falcon was designed:

A first algorithm uses a randomized version of the nearest-plane algorithm, outputs a vector of norm proportional to the norm of Gram-Schmidt matrix of the basis, which is optimal, but runs in $O(n^2)$.

A second algorithm uses a randomized version of the round-off algorithm. It can use the tower of ring structure to run in $O(n \log n)$ but outputs larger vectors.

A third algorithm which is simple, efficient and outputs vectors of optimal norm may be used. However, such algorithm is designed for LWE, and therefore is not straightforwardly suited to NTRU lattices.

A fourth algorithm uses a randomized variant of the nearest-plane algorithm with a fast Fourier-like recursive design allowing to run in $O(n \log n)$. This algorithm is unfortunately not parallelizable.

The Falcon designers chose the fourth algorithm (Fast Fourier sampling, or FFS) for the Falcon trapdoor sampling, in order to combine high performances with the compactness of NTRU lattices.

A large part of the computation for a signature being independent of a given input message m, some of the data used in this computation may be precomputed and stored in memory. Specifically, some data may be stored on a precomputed so-called "expanded key" that comprises the basis on the FFT domain and a tree structure called a "Falcon tree".

A Falcon tree T of height $\kappa$ may be defined inductively, as follows:

A Falcon tree T of height 0 consists of a single node whose value is a real $\sigma > 0$.

A Falcon tree T of height $\kappa > 0$ has for root value T.v, a polynomial $l \in Q_\kappa$ and its left and right children, noted T.l and T.r, are Falcon trees of height $\kappa - 1$.

A Falcon tree may be computed inductively according to the algorithm illustrated by FIG. 4 (Algorithm 5 "LDL-_tree"). At each height, a two-by-two Gram matrix is obtained, based on which a LDL decomposition can be computed. The non-trivial coefficient of $$L = \begin{pmatrix} 1 & 0 \\ \frac{\overline{g_{01}}}{g_{00}} & 1 \end{pmatrix},$$

that is, $$l_{10} = \frac{\overline{g_{01}}}{g_{00}},$$

becomes the root (T.v) of the tree of height $\kappa$. Then, $d_{00}$ and $d_{11}$ are split inductively to compute, respectively, the right and the left children. Finally, the leaves of the tree are normalized with respect to a standard deviation depending on $\kappa_0$, that is, the original height of the tree.

The computation of an expanded key may be performed according to the algorithm illustrated by FIG. 5 (Algorithm 6 "Falcon key expansion").

While data of the Falcon tree is required for the signature of a message m, the computation of the tree may advantageously be performed dynamically, which allows to reduce the memory footprint since only the active branch and the coefficients of the Gram matrices need to be stored in memory. This leads to two possible message signature algorithm designs, as follows:

A first algorithm, referred herein to as the "Tree Signature" or "Tree Variant" algorithm, according to which the key is expanded with the basis on the FFT domain and the tree, and the expanded key is used to sign any number of messages.

A second algorithm, referred herein to as the "Dynamic Signature" or "Dynamic Variant" algorithm, according to which the LDL decompositions are computed on-the-fly with the flow of the signature. This algorithm requires to recompute the LDL decompositions for each signature.

An exemplary implementation of the Tree Signature algorithm is provided in FIG. 6a (Algorithm 7—"Falcon Signature, Tree Variant"), and an exemplary implementation of the Dynamic Signature algorithm is provided in FIG. 6c (Algorithm 9—"Falcon Signature, Dynamic Variant").

In addition, an exemplary implementation of a Dynamic Fast Fourier Sampling algorithm, used in the Dynamic Signature algorithm, is provided in FIG. 7a (Algorithm 10—"Fast-Fourier Sampling, dynamic variant"), and an exemplary implementation of a Tree Variant Fast Fourier Sampling algorithm, used in the Tree Variant Signature algorithm, is provided in FIG. 6b (Algorithm 8—"Fast-Fourier Sampling, tree variant").

FIG. 7b discussed below provides a flowchart of an illustrative implementation of a Falcon dynamic fast Fourier sampling algorithm.

As shown on FIG. 6a for the Tree Variant, we simply remove the LDL computation and the $l_{10}$ polynomial is brought by the LDL tree.

In both variants, we rely on the routine Samp to provide us with integer Gaussian sampling. Further details on this process may be found in PFH20.

At the deepest level of the Fast Fourier Sampling (FFS), we have $t_0$, $t_1 \in \mathbb{R}$, and we simply output $t'_x = \text{Samp}(t_x, \text{T.v})$ for the tree variant and $t'_x = \text{Samp}(t_x, \sqrt{g_{00}}/\sigma_{\kappa_0})$ for the dynamic variant.

As mentioned above, in order to perform a Tree Variant signature, one first needs to expand the private key using a Key Expansion algorithm such as illustrated by FIG. 5 (Algorithm 6—"Falcon key expansion").

In order to perform a Dynamic Variant signature such as illustrated by FIG. 6c (Algorithm 9—"Falcon Signature, Dynamic Variant") in Algorithm 9, the FFT of the basis is recomputed in order to free memory space for the FFS.

The memory consumption for both variants of the FFS and the expanded key is rather large. This is mainly due to the polynomials on the FFT domain that are used to speed up the signature.

During the FFS in the Dynamic Variant, the coefficients of the Gram matrix can be split. As their merged form is not used thereafter, the original coefficients can be overwritten, and only the memory that was initially allocated will be needed.

In addition, a memory buffer is needed to perform the split operation. On the Falcon tree computation, the designers did not use this memory management strategy, and as a result their method uses twice as much memory.

For the Dynamic Variant, we need to store the $l_{10}$ polynomial until the computation of the new target between the two recursive calls. Thus, we need to be able to store a polynomial for each height, which represent $n + n/2 + n/4 + \ldots + 1 = 2n - 1$ double precision coefficients, which is (almost) equivalent to two degree n polynomials. For the target polynomials in both variants, we have a similar rational leading us to 2n double precision coefficients for each target, thus, four degree n polynomials.

In the Table 1 below, we summarize the memory requirement, in bytes, for the exemplary cases of security levels $\kappa = 9$ (corresponding to 128 security bits) and $\kappa = 10$ (corresponding to 256 security bits), for the general formulae, for the expanded key, and the temporary buffers for the Key Expansion algorithm, the Tree Signature algorithm, and the Dynamic Signature algorithm of Falcon. The numbers used in Table 1 below are those given by the reference implementation of Falcon that uses a few more bytes. Also, it does not consider the storage of the roots of unity:

TABLE 1

| memory requirements in bytes for the Falcon signature algorithms | | | |
|---|---|---|---|
| Algorithm | Falcon general formula | $\kappa = 9$ | $\kappa = 10$ |
| Expanded key | $8 \times (\kappa + 1 + 4) \times 2^\kappa$ | 57352 | 122888 |
| Key Expansion | $(4 \times 1 + 6 \times 8) \times 2^\kappa$ | 26631 | 53255 |
| Signature (tree variant) | $(1 \times 2 + 6 \times 8) \times 2^\kappa$ | 25607 | 51207 |
| Signature (dynamic variant) | $(1 \times 2 + 4 \times 1 + 9 \times 8) \times 2^\kappa$ | 39943 | 79879 |

The Falcon signature verification is straightforward, since the signature is only composed of $s_2$. In some embodiments, c and $s_1$ may be first recovered using h, and it may be checked that the vector $(s_1, s_2)$ is indeed shorter than the bound $\beta$.

FIG. 8 shows an exemplary implementation of a Falcon signature verification algorithm.

FIG. 7b shows a block diagram illustrating the implementation (10) of the Falcon dynamic Fast Fourier Algorithm (FFS) that may be used in embodiments of the present subject disclosure. For example, the FFS algorithm illustrated by FIG. 7b may be used in the dynamic variant of the Falcon signature scheme, such as implemented by the exemplary algorithm illustrated by FIG. 6c ("FFS$_{Dyn}$" call in operation 7: "$(\hat{t}_0, \hat{t}_1) \leftarrow FFS_{Dyn}(\hat{t}_0, \hat{t}_1, G)$").

Such fast Fourier sampling scheme (10) may be implemented by a computer system, e.g. at a processing node of a computer system.

The Falcon dynamic fast Fourier sampling is a recursive algorithm that takes as input data a 2×2 Gram matrix G (11) whose coefficients are polynomials and a target vector (12a, 12b) t=[$t_0$, $t_1$], where $t_0$ and $t_1$ are polynomials, and produces as output data two polynomials $t'_0$ and $t'_1$. As shown on FIG. 7b, the FFS algorithm may be implemented with three stages ("Stage 1", "Stage 2", and "Stage 3"), each separated by a recursive call ("ffSampling" blocks 10a and 10b). In the FFS algorithm illustrated on FIG. 7b, the "splitfft" and "mergefft" functions may be implemented according to the algorithms described above, and illustrated on FIGS. 2a and 2b, respectively.

As shown on FIG. 7b, the following operations may be performed in the first stage (10_1): The LDL decomposition of the matrix G is computed (13_1), and produces diagonal coefficients $d_{00}$ and $d_{11}$ of the D matrix of the LDL decomposition, and the lower coefficient $l_{10}$ of the L matrix of the decomposition: G is decomposed into a matrix product as a unique matrix product L.D.L*, with L being a lower triangular matrix with ones on the diagonal, and D being a diagonal matrix.

$$\text{For } G = \begin{pmatrix} g_{00} & g_{01} \\ g_{10} & g_{11} \end{pmatrix},$$

$$\text{we have } D = \begin{pmatrix} d_{00} & 0 \\ 0 & d_{11} \end{pmatrix} = \begin{pmatrix} g_{00} & 0 \\ 0 & g_{11} - \dfrac{|g_{01}|^2}{g_{00}} \end{pmatrix},$$

$$\text{and } L = \begin{pmatrix} 1 & 0 \\ l_{10} & 1 \end{pmatrix} = \begin{pmatrix} 1 & 0 \\ \dfrac{g_{01}}{g_{00}} & 1 \end{pmatrix}.$$

Then, respective splits ("splitfft" 14_1a and 14_1b) of the coefficients $d_{00}$ and $d_{11}$ of the D matrix are computed, and the results of these splits are used as Gram matrix data input to the two recursive calls between stages 1 and 2 (ffSampling call 10a), and between stages 2 and 3 (ffSampling call 10b), respectively.

In addition, in the first stage (10_1) the polynomial $t_1$ is split ("splitfft" 14_1c), and the result of this split is used as target vector data input to the recursive call between stages 1 and 2 (ffSampling call 10a).

As shown on FIG. 7b, the stage 2 (10_2) uses as input data the computed coefficient $l_{10}$, the result data of the split of $d_{00}$, and the input data $t_0$ and $t_1$.

The following operations may be performed in the second stage (10_1): The output of the recursive call ("ffSampling" 10a) may be merged ("mergefft" 15_2) to produce a polynomial $t'_1$ which will comprised in the output data of the FFS algorithm.

In addition, the operation $$(t_1 - t'_1) \cdot l_{10} + t_0$$

is performed, and the result of this operation is split ("splitfft" 16_2). The result of the split operation (14_1b) of $d_{00}$ in the first stage (10_1) is used as Gram matrix data input to the recursive call between stages 2 and 3 (ffSampling call 10b), and the result of this split operation (16_2) is used as target vector data input to this recursive call (ffSampling call 10b).

The following operations may be performed in the third stage (10_3): The output of the second recursive call ("ffSampling" 10b) may be merged ("mergefft" 17_3) to produce a polynomial $t'_0$ which will comprised in the output data of the FFS algorithm, together with the polynomial $t'_1$ output by the second stage (10_2).

As shown on FIG. 7b, the output of each recursive calls ("ffSampling" 10a and 10b) comprises two polynomials that are merged into one polynomial using a "mergefft" algorithm (15_2 and 17_3, respectively) such as the exemplary one illustrated by FIG. 2b.

At the deepest recursive call level of the FFS algorithm illustrated on FIG. 7b, that is, at the level where the input polynomials are real constants, two discrete Gaussian sampling respectively centered at $t_0$ and $t_1$, and with standard deviation $\sigma_{min}/\sqrt{g_{00}}$ (with $\sigma_{min}$ being a predetermined constant) are performed.

Therefore, as illustrated on FIG. 7b, the dynamic variant of the Falcon fast Fourier sampling algorithm may be implemented using recursive calls. In some embodiments, the present subject disclosure takes advantage of these recursive calls for providing an improved scheme for managing memory space required for implementing the algorithm.

In contrast, for the tree variant of the Falcon fast Fourier sampling, the needed coefficients that are computed from the Gram matrix G may be pre-computed in a Falcon tree as described above.

The memory consumption for both variants (tree variant and dynamic variant) of the Falcon signature is relatively high due to the double precision coefficients. However, the reference implementations given by the Falcon designers does not fully take advantage of the structure of a Gram matrix. While it might not appear as a problem on computers with large amount of RAM, most embedded devices have more restrained memory resources.

In order to address this constraint, the proposed scheme advantageously allows reducing the memory footprint of the Falcon signature algorithms. The scheme advantageously uses the structure of a Gram matrix, which is self-adjoint, to avoid computing and storing $g_{10}$, since it is equal to $\overline{g_{01}}$. Depending on the embodiment, it is also possible to use one or more, or all of the properties of self-adjoint matrices, to advantageously avoid superfluous computation and reduce memory usage, which results in a reduction of memory requirements for implementing the Falcon signature algorithms.

Depending on the embodiment, two aspects can be leveraged to optimize the implementation of a signature scheme such as Falcon by reducing the memory footprint of the implementation:

In some embodiments, the proposed scheme advantageously leverages the aspect according to which the diagonal coefficients of a Gram matrix are real numbers.

In some embodiments, the proposed scheme advantageously leverages the aspect according to which except for the top-level call of recursive implementations of Falcon functions, the Gram matrices are quasi-cyclic.

In one or more embodiments, the proposed scheme advantageously uses the structure of a Gram matrix (as used to implement the Falcon signature scheme) to improve the management of the memory of the computer on which Falcon is implemented by reducing the memory footprint of the Falcon signature scheme.

As the diagonal coefficients $g_{00}$ and $g_{11}$ of the Gram matrix G (which is used as signature generation matrix in the Falcon signature scheme) are real numbers (and not complex numbers), the present subject disclosure provides that there is no need to store an imaginary part of these diagonal coefficients, nor to consider them as general complex number.

As a consequence, in one or more embodiments, during the computation of the LDL decomposition of the signature generation matrix G, the $l_{10}$ coefficient of the L matrix of the LDL decomposition may be computed as $l_{10} = \overline{g_{01}}/g_{00}$ as described above, however since $g_{00}$ is a real number, there is no need to implement this division as a general complex division. In other words, since $g_{00}$ is real, it is sufficient to compute its inverse $1/g_{00}$, and to perform a real-complex multiplication with $\overline{g_{01}}$. Using a real inverse computation followed by a real-complex multiplication advantageously reduces the computation complexity of the LDL decomposition, and also improves precision. This improvement allows reducing the size of the memory buffer used for implementing the LDL decomposition algorithm (used for the dynamic variant of the FFS algorithm as illustrated by FIG. 7b and/or used for the key expansion algorithm as illustrated by FIG. 5) by one degree n polynomial.

In one or more embodiments, the proposed scheme advantageously uses the specific form of the Gram matrix (as used to implement the dynamic FFS algorithm illustrated on FIG. 7b and the LDL_tree algorithm illustrated on FIG. 4) to improve the management of the memory of the computer on which Falcon is implemented by reducing the memory footprint of the Falcon signature scheme. As shown on FIG. 4 for the LDL_tree algorithm, and on FIG. 7b for the dynamic FFS algorithm, the LDL_tree and dynamic FFS algorithms use recursive calls, each of which uses a Gram matrix as input data.

Specifically, as shown on FIG. 4, the LDL_tree algorithm operating on a height κ, an original height $κ_0$, and a Gram matrix G as input data, includes two recursive calls (operation 11: "T.r←LDL_tree($G_0$, κ−1, $κ_0$)" and operation 12: "T.r←LDL_tree($G_1$, κ−1, $κ_0$)"). As shown on FIG. 7b, the ffSampling algorithm (10) includes two recursive calls (10a) and (10b). For each of these two algorithms, the first call (which may be referred to herein as the "top height") will trigger at least one trigger recursive call, which will correspond to an execution of the algorithm at a lower height, and each call at a given height will trigger an execution of the algorithm at a lower height.

The Gram matrix used as input data of the top height of the dynamic FFS algorithm and the LDL tree algorithm does not have any specific form. Indeed, as shown on line 4 of the Falcon Signature algorithm (dynamic variant) illustrated by FIG. 6c (Algorithm 9), the first signature generation matrix G used for the initial call of the $FFS_{Dyn}$ function is obtained in the frequency domain based on the key B: "Ĝ←B̂·B̂*". In some embodiments, the G matrix may be a 2×2 Gram matrix, therefore of the form $$ G = \begin{pmatrix} g_{00} & g_{01} \\ \overline{g_{01}} & g_{11} \end{pmatrix}, $$

where $\overline{g_{01}}$ designates the complex conjugate of $g_{01}$, the storage of which requiring the memory space for storing $g_{00}$, $g_{01}$, and $g_{11}$.

However, in one or more embodiments, for lower heights, the Gram matrix used in recursive calls of the dynamic FFS algorithm or the LDL_tree algorithm is of the following form:

$$ G = \begin{pmatrix} g_{00} & g_{01} \\ \overline{g_{01}} & g_{00} \end{pmatrix} $$

(referred to herein as "quasi-cyclic" form), where goi designates the complex conjugate of $g_{01}$, the storage of which requiring only the memory space for storing $g_{00}$ and $g_{01}$ (instead of requiring the memory space for storing $g_{00}$, $g_{01}$, and $g_{11}$)

Referring to the dynamic FFS algorithm illustrated by FIG. 7b, this is due to the fact that, besides the input matrix G (11) which is generated based on the key B, the other G matrices that are used as input of the recursive calls "ffSampling" (10a) and (10b) are the results of the splitfft call (14_1a, 14_1b) applied to the coefficients $d_{11}$ and $d_{00}$, respectively.

Likewise, for the LDL_tree algorithm of Falcon (such as illustrated on FIG. 4), the Gram matrix used as input data of the top height of the algorithm is the Gram matrix G used as input to the algorithm. As shown on lines 8 and 10 of the Falcon LDL_tree algorithm illustrated by FIG. 4, the Gram matrix G0 and G1 used respectively in the recursive calls of lines 11 and 12 are both of the form $$ \begin{pmatrix} s_0 & s_1 \\ \overline{s_1} & s_0 \end{pmatrix}, $$

where $\overline{s_1}$ designates the complex conjugate of $s_1$, the storage of which requiring only the memory space for storing $s_0$ and $s_1$.

Therefore, after determining the first LDL representation, there is no longer a need to store in a memory buffer the matrix coefficient $g_{11}$, as the storing in memory of a matrix of the form $$ \begin{pmatrix} g_{00} & g_{01} \\ \overline{g_{01}} & g_{00} \end{pmatrix} $$

only requires memory space for storing the matrix coefficients $g_{00}$ and $g_{01}$. In one or more embodiments, the very first coefficient may be stored in an empty buffer, that is, a memory buffer that is not specifically dedicated to the storing of the matrix coefficient $g_{11}$, which advantageously reduces the size of the memory buffer used for executing the dynamic signature algorithm and the key expansion algorithm by a n/2 degree polynomial.

As shown in FIG. 7b for the "fast Fourier sampling" algorithm (for the dynamic variant of the signature algorithm), the "splitfft" function may, in some embodiments, be applied to the polynomials $d_{00}$ and $d_{11}$, which are real polynomials.

For this purpose, in order to reduce computational cost and associated use of memory resource, a new "splitfft" function which operates a split of a real polynomial in the frequency domain, referred to herein as "real_splitfft", is proposed in the present subject disclosure. An exemplary implementation of the proposed "real_splitfft" function is shown in the algorithm of FIG. 9a ("Algorithm 12 real_splitfft").

Implementing this proposed split function advantageously provides a memory usage optimization as the output of the "real_splitfft" are real polynomials, and reduces the butterfly cost. Specifically, the computational cost of the Falcon "splitfft" algorithm includes that of two complex additions (including a complex subtraction which corresponds to the same cost) and one complex multiplication per coefficient, which corresponds to six real additions and four real multiplications per coefficient. In comparison, the computational cost of the exemplary implementation of the proposed "real_splitfft" function merely includes that of 2 real additions per coefficient.

As shown on FIG. 9a, in some embodiments, the proposed "real_splitfft" algorithm splits an input real polynomial f into two real polynomials $f_0$ and $f_1$. The two output polynomials may be denoted $f_0$ and $f'_1$, and may be defined by their coordinates in the frequency domain. The proposed algorithm may use a loop over half of the coordinates of the input f, indexed by the root of unity $\zeta$ in the frequency domain (as the other half may be indexed by the opposite of the root of unity $-\zeta$). In each iteration of the loop, the index for $f_0$ and $f'_1$, denoted $\zeta'$, is first computed. Then the values $f_0(\zeta')$ and $f'_1(\zeta')$ are respectively computed as follows:

$$f_0(\zeta') \leftarrow \frac{1}{2}(f(\zeta) + f(-\zeta)), \text{ and } f'_1(\zeta') \leftarrow \frac{1}{2}(f(\zeta) - f(-\zeta)).$$

As compared with the Falcon "splitfft" algorithm illustrated by FIG. 2a which requires a complex operation for computing $$f_1(\zeta') \left( f_1(\zeta') \leftarrow \frac{1}{2\zeta}(f(\zeta) - f(-\zeta)) \right),$$

the computation of $f'_1(\zeta')$ according to the proposed "real_splitfft" algorithm avoids such complex operation.

Therefore, referring to FIG. 7b, in some embodiments, the "splitfft" operations (14-1a and 14-1b) respectively used for splitting the polynomials $d_{00}$ and $d_{11}$ may, for each call of the "ffSampling" function (including recursive calls), advantageously be implemented using the proposed "real_splitfft" algorithm, instead of the "splitfft" specified by Falcon, as the polynomials $d_{00}$ and $d_{11}$ are real polynomials.

In addition, as the root of unity (e.g. the root of unity $\zeta$ used in the Falcon splitfft algorithm, such as illustrated by FIG. 2a) is a constant, the multiplication with the root of unity can be delayed in the computations. Therefore, the real output is denoted $g'_{01}$, and the root of unity multiplication used in the Falcon splitfft algorithm, such as illustrated by FIG. 2a (e.g. on line 4, as dividing by the root of unity $\zeta$ may be performed using a complex multiplication by a complex conjugate of the root of unity $\zeta$) may be performed only once the coefficient $g_{01}$ is actually needed. In particular, in some embodiments of the Falcon specifications, the coefficient $g_{01}$ may only be needed for the LDL representation computation.

The LDL decomposition involves the computation of a D matrix, and a L matrix, based on a G matrix, with:

$$G = \begin{pmatrix} g_{00} & g_{01} \\ \overline{g_{01}} & g_{11} \end{pmatrix},$$

and results in:

$$D = \begin{pmatrix} g_{00} & 0 \\ 0 & g_{11} - \frac{|g_{01}|^2}{g_{00}} \end{pmatrix}$$

and $$L = \begin{pmatrix} 1 & 0 \\ \frac{g_{01}}{g_{00}} & 1 \end{pmatrix}.$$

If one sets $g_{01} = s \cdot g'_{01}$, where $g'_{01}$ is the output of the "real_splitfft" function provided by the present subject disclosure, and s is the root of unity that was delayed, it follows that:

$$d_{11} = g_{11} - \frac{\overline{g_{01}} \cdot g_{01}}{g_{00}} = g_{11} - \frac{\overline{s \cdot g'_{01}} \cdot s \cdot g'_{01}}{g_{00}} = g_{11} - \overline{s} \cdot s \frac{{g'_{01}}^2}{g_{00}} = g_{11} - \frac{{g'_{01}}^2}{g_{00}}.$$

In view of the above computation, as $\overline{s} \cdot s = 1$ (as s is a root of unity), in some embodiments, there is no need to multiply by the root of unity for $d_{11}$, and a complex multiplication is replaced with a real multiplication, thereby improving computation complexity performances as well as precision of the computation.

In addition, $$l_{10} = \frac{\overline{g_{01}}}{g_{00}} = \frac{\overline{s} \cdot g'_{01}}{g_{00}}.$$

Therefore, if we denote $$l'_{10} = \frac{g'_{01}}{g_{00}},$$

in some embodiments the computation of the real-complex multiplication by s may be delayed, and $l'_{10}$ can be stored in memory.

In addition, in computations with $\kappa=1$, $s=\sqrt{2}/2 + i\sqrt{2}/2$, so that the number of multiplications may advantageously be reduced.

As discussed above, for the implementation of the dynamic FFS algorithm, the proposed scheme advantageously allows reducing the memory usage by a half polynomial because the top $l_{10}$ does not ensue from a quasi-cyclic Gram matrix.

For the tree variant signature algorithm, the memory usage reduction benefit provided by the proposed scheme comes from the expanded key algorithm where we can cut off $\kappa-1$ half polynomials from the $\kappa+1$ whole polynomial of the tree. In the tree FFS, there might be a small computational overhead since the multiplication by s may be delayed from the LDL tree computation to the FFS.

Table 2 below provides a comparison of the theoretical memory requirement in bytes for the signature related algorithms between the original Falcon design and the proposed scheme:

TABLE 2 comparison of memory requirements in bytes between
the original Falcon design and the proposed scheme

| | Falcon general formula | |
| --- | --- | --- |
| Algorithm | Original Falcon design | Proposed scheme |
| Expanded key | $8 \times (\kappa + 1 + 4) \times 2^\kappa$ bytes | $8 \times ((\kappa + 1)/2 + 1 + 4) \times 2^\kappa$ bytes |
| Key Expansion | $(4 \times 1 + 6 \times 8) \times 2^\kappa$ bytes | $(4 \times 1 + 3 \times 8) \times 2^\kappa$ bytes |
| Signature (tree variant) | $(1 \times 2 + 6 \times 8) \times 2^\kappa$ bytes | $(1 \times 2 + 4 \times 8) \times 2^\kappa$ bytes |
| Signature (dynamic variant) | $(1 \times 2 + 4 \times 1 + 9 \times 8) \times 2^\kappa$ bytes | $(1 \times 2 + 4 \times 1 + 6.5 \times 8) \times 2^\kappa$ bytes |

Table 3 below presents the reduced memory consumption provided by the proposed scheme, and shows that, depending on the embodiment, the proposed scheme may provide a benefit of 25% to 46%.

In some embodiments, the key expansion could be performed without any additional buffers by storing the temporary variables in the LDL tree.

TABLE 3 comparison of memory requirements in bytes between
the original Falcon design and the proposed scheme

| | $\kappa = 9$ | | | $\kappa = 10$ | | |
| --- | --- | --- | --- | --- | --- | --- |
| Algorithm | Original Falcon design | Proposed scheme | Gain | Original Falcon design | Proposed scheme | Gain |
| Signature (dynamic variant) | 39943 bytes | 29703 bytes | 31% | 79879 bytes | 59399 bytes | 31% |
| Key Expansion | 26631 bytes | 14343 bytes | 46% | 53255 bytes | 28679 bytes | 46% |
| Expanded key | 57352 bytes | 40968 bytes | 29% | 122888 bytes | 86024 bytes | 30% |
| Signature (tree variant) | 25607 bytes | 17415 bytes | 32% | 51207 bytes | 34823 bytes | 32% |

FIG. 9*b* shows a flow chart diagram illustrating the memory management (20) in a computer system configured for generating a signature of a binary data message m using a key B of a predetermined lattice-based structure according to embodiments of the present subject disclosure.

As described with reference to FIG. 9*b*, in one or more embodiments, coefficients of a 2×2 signature generation matrix SG may be first determined (21), where the non-diagonal coefficients of signature generation matrix SG are complex polynomials with a non-zero imaginary part, and the diagonal coefficients of the signature generation matrix SG are real polynomials.

In some embodiments, the 2×2 signature generation matrix SG may be of the form $$SG = \begin{pmatrix} g_{00} & g_{01} \\ g_{10} & g_{11} \end{pmatrix},$$

with $g_{00}$ and $g_{11}$ being real polynomials, and $g_{01}$ and $g_{10}$ being complex polynomials with a non-zero imaginary part.

In one or more embodiments, further to determining the coefficients of the 2×2 signature generation matrix SG, a LDL representation of the signature generation matrix SG is determined (22), according to which SG is represented by a matrix product L.D.L*, wherein L is a 2×2 lower triangular matrix with ones on the diagonal, D is a 2×2 diagonal matrix, and L* is the adjoint of L.

In some embodiments, the L matrix may be of the form $$L = \begin{pmatrix} 1 & 0 \\ l_{10} & 1 \end{pmatrix},$$

and the coefficient $l_{10}$ of the matrix L may be determined as $$l_{10} = \frac{\overline{g_{01}}}{g_{00}},$$

wherein the signature generation matrix SG is of the form $$\begin{pmatrix} g_{00} & g_{01} \\ g_{10} & g_{11} \end{pmatrix},$$

where $g_{00}$ and $g_{11}$ are real polynomials, and $g_{10}$ and $g_{01}$ are complex polynomials. In some embodiments, the computing the coefficient $l_{10}$ of the matrix L may comprise the computing of the inverse $1/g_{00}$ of the real polynomial coefficient $g_{00}$, and performing a real-complex multiplication of $1/g_{00}$ with the complex polynomial $\overline{g_{01}}$.

In some embodiments, the D matrix may be of the form $$D = \begin{pmatrix} d_{00} & 0 \\ 0 & d_{11} \end{pmatrix},$$

and may be determined as:

$$\begin{pmatrix} g_{00} & 0 \\ 0 & g_{11} - \frac{|g_{01}|^2}{g_{00}} \end{pmatrix},$$

wherein the signature generation matrix SG is of the form $$\begin{pmatrix} g_{00} & g_{01} \\ g_{10} & g_{11} \end{pmatrix},$$

where $g_{00}$ and $g_{11}$ are real polynomials, and $g_{10}$ and $g_{01}$ are complex polynomials.

In one or more embodiments, the storing in a memory buffer of the computer system of the coefficients of the signature generation matrix SG and the coefficients of the matrices of the LDL representation based on that (a) the signature generation matrix SG has real diagonal coefficients, and/or (b) the memory buffer is used alternatively to store the coefficients of the signature generation matrix SG or the coefficients of the matrix D of the LDL representation. As a consequence, advantageously, memory usage is reduced (and therefore the memory space required for using the proposed scheme for implementing a signature algorithm according to the present subject disclosure), part or all of the same memory space that is used to store the signature generation matrix SG may be reused for storing the matrix D of the LDL representation.

As discussed above, the proposed memory management scheme may advantageously be used when implementing a signature generation algorithm, such as according to the Falcon signature scheme, for reducing the memory footprint of the implementation without any significant degradation of performances. The resulting memory footprint reduction may advantageously be used when implementing a signature generation algorithm on computer systems with limited memory resources, such as, for example, embedded implementations of the software generation algorithm.

Figure 10:
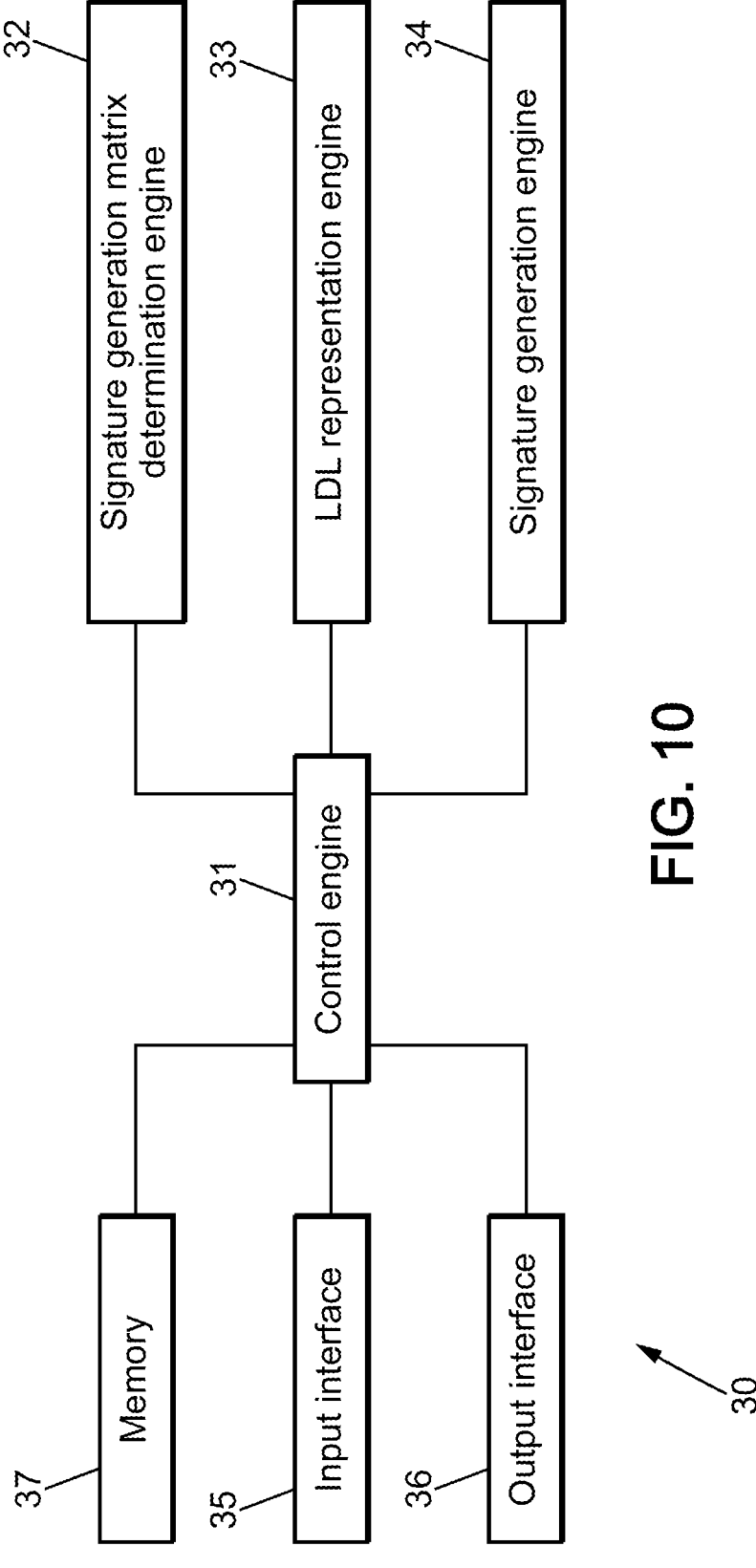
FIG. 10 is a diagram illustrating an exemplary architecture of a computer system for implementing the proposed method, in accordance with one or more embodiments.

An exemplary architecture of a non-quantum computer apparatus according to the present subject disclosure is illustrated on FIG. 10, which shows a computer apparatus (30) configured to perform a memory management method in accordance with embodiments of the present subject disclosure.

The computer apparatus 30 includes a control engine 31, a signature generation matrix determination engine 32, a LDL representation determination engine 33, a signature generation engine 34, an input interface 35, an output interface 36, and a memory 37.

In the architecture illustrated on FIG. 10, all of the signature generation matrix determination engine 32, LDL representation determination engine 33, signature generation engine 34, input interface 35, output interface 36, and memory 37 are operatively coupled with one another through the control engine 31.

In some embodiments, the input interface 35 is configured for receiving data representing a binary data message m, and data representing a key B that was generated, and transmitting received data to the control engine 31 for further processing according to embodiments of the present subject disclosure.

In some embodiments, the output interface 36 is configured for outputting data representing a signed message corresponding to the input binary data message m signed using the key B, or a signature generated based on a binary data message m using the key B, and transmitting such data to an external host or to another engine of the computer apparatus 30.

In some embodiments, the signature generation matrix determination engine 32 may be configured to process received data for determining, based on the key B, coefficients of a 2×2 signature generation matrix SG, where the non-diagonal coefficients of the signature generation matrix SG are complex polynomials with a non-zero imaginary part, and the diagonal coefficients of the signature generation matrix SG are real polynomials.

In some embodiments, the LDL representation engine 33 may be configured to process the signature generation matrix SG determined by the signature generation matrix determination engine 32. In particular, in one or more embodiments, the LDL representation engine 33 is configured to determine a LDL representation of the signature generation matrix SG (determined by the signature generation matrix determination engine 32). The LDL representation is such that SG is represented by a matrix product L.D.L*, wherein L is a 2×2 lower triangular matrix with ones on the diagonal, D is a 2×2 diagonal matrix, and L* is the adjoint of L.

In some embodiments, the signature generation engine 34 may be configured to implement signature algorithms according to a signature scheme, such as the Falcon signature scheme, used by the computer apparatus 30 for signing the message m.

In some embodiments, the computer apparatus 30 does not include a memory management engine, and one or more embodiments of the memory management scheme provided in the present subject disclosure are implemented in the software programming of the engines of the computer apparatus 30, such as the signature generation matrix determination engine 32, the LDL representation engine 33, and the signature generation engine 34.

The control engine 31 includes a processor, which may be any suitable microprocessor, microcontroller, Field Programmable Gate Arrays (FPGA), Application Specific Integrated Circuits (ASIC), Digital Signal Processing chip, and/or state machine, or a combination thereof. According to various embodiments, one or more of the computers can be configured as a multi-processor computer having multiple processors for providing parallel computing. The control engine 31 may also comprise, or may be in communication with, computer storage media, such as, without limitation, the memory 37, capable of storing computer program instructions or software code that, when executed by the processor, cause the processor to perform the elements described herein. In addition, the memory 37 may be any type of data storage or computer storage medium coupled to the control engine 31 and operable with the interfaces 35-36 to facilitate management of data stored in association therewith, such as, for example, a cache memory, a RAM memory, a ROM memory, a FPGA memory, a datacenter, a data cloud, or a combination thereof.

In some embodiments, the memory 37 may comprise a memory buffer dimensioned for storing the coefficients of the signature generation matrix SG and the coefficients of the matrices of the LDL representation based on that (a) the signature generation matrix SG has real diagonal coefficients, and/or (b) the memory buffer is used alternatively to store the coefficients of the signature generation matrix SG or the coefficients of the matrix D of the LDL representation. In some embodiments, the size of the memory buffer may be reduced to that needed for managing the memory buffer according to the present disclosure. For example, in some embodiments, the size of the memory buffer may be reduced to that needed for storing the coefficients of the signature generation matrix SG and the coefficients of the matrices of the LDL representation based on that (a) the signature generation matrix SG has real diagonal coefficients, and/or (b) the memory buffer is used alternatively to store the coefficients of the signature generation matrix SG or the coefficients of the matrix D of the LDL representation.

In addition, the memory 37 may be configured to store the polynomials $$t_0'$$

and $$t_1'$$

which are generated when implementing the dynamic variant of the Fast Fourier Sampling algorithm of the Falcon scheme, which polynomials depend on the input message m to be signed, and the signature key B.

It will be appreciated that the computer apparatus 30 shown and described with reference to FIG. 10 is provided by way of example only. Numerous other architectures, operating environments, and configurations are possible. Other embodiments of the node may include fewer or greater number of components, and may incorporate some or all of the functionality described with respect to the processing node components shown in FIG. 10. Accordingly, although the control engine 31, signature generation matrix determination engine 32, LDL representation engine 33, signature generation engine 34, input interface 35, output interface 36, and memory 37 are illustrated as part of the system 30, no restrictions are placed on the location and control of components 30-37. In particular, in other embodiments, components 30-37 may be part of different entities or computing systems.

In particular, the computer apparatus 30 may be embedded computer system, an electronic component (e.g. a FPGA device), or any other device comprising a processor operatively coupled with a memory.

The computer apparatus 30, and more generally any device configured for implementing embodiments of the present subject disclosure, may be implemented in software, in hardware, such as for example in an ASIC component, or in a combination of software and hardware, such as for example as a computer program designed to be loaded and executed on a FPGA device.

While the present subject disclosure has been described with respect to preferred embodiments, those skilled in the art will readily appreciate that various changes and/or modifications can be made to the present subject disclosure without departing from the scope of the present subject disclosure as defined by the appended claims.

Although this subject disclosure has been disclosed in the context of certain preferred embodiments, it should be understood that certain advantages, features and aspects of the systems, devices, and methods may be realized in a variety of other embodiments. Additionally, it is contemplated that various aspects and features described herein can be practiced separately, combined together, or substituted for one another, and that a variety of combination and sub-combinations of the features and aspects can be made and still fall within the scope of the subject disclosure. Furthermore, the systems and devices described above need not include all of the modules and functions described in the preferred embodiments.

Information and signals described herein can be represented using any of a variety of different technologies and techniques. For example, data, instructions, commands, information, signals, bits, symbols, and chips can be represented by voltages, currents, electromagnetic waves, magnetic fields or particles, optical fields or particles, or any combination thereof.

Depending on the embodiment, certain acts, events, or functions of any of the methods described herein can be performed in a different sequence, may be added, merged, or left out all together (e.g., not all described acts or events are necessary for the practice of the method). Moreover, in certain embodiments, acts or events may be performed concurrently rather than sequentially.

The invention claimed is:

1. A computer-implemented method for memory management in a computer system configured for generating a signature of a binary data message m using a key B of a predetermined lattice-based structure, the method comprising:

determining, based on the key B, coefficients of a 2×2 signature generation matrix SG, wherein non-diagonal coefficients of the signature generation matrix SG are complex polynomials with a non-zero imaginary part, and diagonal coefficients of the signature generation matrix SG are real polynomials;

determining a LDL representation of the signature generation matrix SG according to which SG is represented by a matrix product L.D.L*, wherein L is a 2×2 lower triangular matrix with ones as diagonal coefficients, D is a 2×2 diagonal matrix, and L* is the adjoint matrix of L, wherein matrix L is of form $$\begin{pmatrix} 1 & 0 \\ l_{10} & 1 \end{pmatrix},$$

the method further comprising: computing coefficient $l_{10}$ of the matrix L as $$l_{10} = \frac{\overline{g_{01}}}{g_{00}},$$

wherein the signature generation matrix SG is of form $$\begin{pmatrix} g_{00} & g_{01} \\ g_{10} & g_{11} \end{pmatrix},$$

where $g_{00}$ and $g_{11}$ are real polynomials, and $g_{10}$ and $g_{01}$ are complex polynomials and $g_{10}$ is equal to complex conjugate $\overline{g_{10}}$ of $g_{01}$, D is of form $$\begin{pmatrix} d_{00} & 0 \\ 0 & d_{11} \end{pmatrix}$$

and determined as:

$$\begin{pmatrix} g_{00} & 0 \\ 0 & g_{11} - \frac{|g_{01}|^2}{g_{00}} \end{pmatrix},$$

and wherein computing the coefficient $l_{10}$ of the matrix L comprises: computing inverse $1/g_{00}$ of real coefficient $g_{00}$, and performing a real-complex multiplication of $1/g_{00}$ with the complex polynomial $\overline{g_{01}}$; and managing storing in a memory buffer of the computer system of coefficients of the signature generation matrix SG and coefficients of the matrices of the LDL representation based on:

(a) the signature generation matrix SG is of form $$\begin{pmatrix} g_{00} & g_{01} \\ g_{10} & g_{11} \end{pmatrix},$$

where diagonal coefficients $g_{00}$ and $g_{11}$ are real polynomials, $g_{10}$ and $g_{01}$ are complex polynomials and $g_{10}$ is equal to complex conjugate $\overline{g_{10}}$ of $g_{01}$, D is of form $$\begin{pmatrix} d_{00} & 0 \\ 0 & d_{11} \end{pmatrix}$$

and determined as:

$$\begin{pmatrix} g_{00} & 0 \\ 0 & g_{11} - \dfrac{|g_{01}|^2}{g_{00}} \end{pmatrix};$$

and where the memory buffer is used alternatively to store coefficients of the signature generation matrix SG or coefficients of the matrix D of the LDL representation, and the coefficient $d_{11}$ is stored in the memory buffer by overwriting one or more coefficients of the signature generation matrix SG.

2. The method according to claim 1, wherein the memory buffer is dimensioned for storing complex non-diagonal coefficients and real diagonal coefficients of the signature generation matrix SG.

3. The method according to claim 1, wherein the key B has a matrix structure, and the signature generation matrix is determined based on matrix product B.B*, wherein B* is the adjoint matrix of B.

4. The method according to claim 1, wherein the key B has a matrix structure, and the signature generation matrix is determined based on matrix product $\hat{B}.\hat{B}$*, wherein $\hat{B}$* is adjoint matrix of $\hat{B}$, and wherein $\hat{B}$ is obtained based on a transform of matrix B in a frequency domain.

5. The method according to claim 1, wherein the signature generation matrix SG is of form:

$$\begin{pmatrix} g_{00} & g_{01} \\ \overline{g_{01}} & g_{00} \end{pmatrix},$$

wherein $g_{00}$ is a real polynomial, $g_{01}$ is a complex polynomial, and $\overline{g_{01}}$ is complex conjugate of $g_{01}$, and wherein the memory buffer is dimensioned for storing $g_{00}$ and real and imaginary parts of $g_{01}$.

6. The method according to claim 1, wherein the signature generation matrix is a Gram matrix of size 2×2.

7. The method according to claim 1, further comprising: generating a signature $s_2$ of message m based on determination of coefficients of the signature generation matrix SG, and determination of the LDL representation of the signature generation matrix SG.

8. The method according to claim 1, wherein the key B is of form $$\begin{pmatrix} g & -f \\ G & -F \end{pmatrix},$$

wherein f, g, F, and G are polynomials of $\mathbb{Q}[x]/(\phi_\kappa)$, where $\Phi_\kappa = x^n + 1 \in \mathbb{Z}[x]$ for $n = 2^\kappa$, and $\kappa$ be a positive integer which verify equation $f \cdot G - g \cdot F = q \mod (\phi_\kappa)$, where q is a constant equal to $12 \times 2^{10} + 1$.

9. An apparatus, the apparatus comprising a processor and a memory operatively coupled to the processor, wherein the apparatus is configured to perform a method for memory management in a computer system configured for generating a signature of a binary data message m using a key B of a predetermined lattice-based structure, the method comprising:

determining, based on the key B, coefficients of a 2×2 signature generation matrix SG, wherein non-diagonal coefficients of the signature generation matrix SG are complex polynomials with a non-zero imaginary part, and diagonal coefficients of the signature generation matrix SG are real polynomials;

determining a LDL representation of the signature generation matrix SG according to which SG is represented by a matrix product L.D.L*, wherein L is a 2×2 lower triangular matrix with ones as diagonal coefficients, D is a 2×2 diagonal matrix, and L' is the adjoint matrix of L, wherein matrix L is of form $$\begin{pmatrix} 1 & 0 \\ l_{10} & 1 \end{pmatrix},$$

the method further comprising: computing coefficient $l_{10}$ of the matrix L as $l_{10} = \overline{g_{01}}/g_{00}$, wherein the signature generation matrix SG is of form $$\begin{pmatrix} g_{10} & g_{11} \end{pmatrix},$$

where $g_{00}$ and $g_{11}$ are real polynomials, and $g_{10}$ and $g_{01}$ are complex polynomials, and $g_{10}$ is equal to complex conjugate $\overline{g_{10}}$ of $g_{01}$, the diagonal matrix D is of form $$\begin{pmatrix} d_{00} & 0 \\ 0 & d_{11} \end{pmatrix}$$

and determined as:

$$\begin{pmatrix} g_{00} & 0 \\ 0 & g_{11} - \dfrac{|g_{01}|^2}{g_{00}} \end{pmatrix},$$

and wherein computing the coefficient $l_{10}$ of the matrix L comprises: computing inverse $1/g_{00}$ of real coefficient $g_{00}$, and performing a real-complex multiplication of $1/g_{00}$ with the complex polynomial $\overline{g_{01}}$; and managing storing in a memory buffer of the computer system of the coefficients of the signature generation matrix SG and coefficients of the matrices of the LDL representation based on:

where the memory buffer is used alternatively to store coefficients of the signature generation matrix SG or coefficients of the matrix D of the LDL representation and the coefficient $d_{11}$ is stored in the memory buffer by overwriting one or more coefficients of the signature generation matrix SG.

10. A non-transitory computer-readable medium encoded with executable instructions which, when executed, causes an apparatus comprising a processor and a memory operatively coupled to the processor, to perform a method for memory management in a computer system configured for generating a signature of a binary data message m using a key B of a predetermined lattice-based structure, the method comprising:

determining, based on the key B, coefficients of a 2×2 signature generation matrix SG, wherein non-diagonal coefficients of the signature generation matrix SG are complex polynomials with a non-zero imaginary part, and diagonal coefficients of the signature generation matrix SG are real polynomials;

determining a LDL representation of the signature generation matrix SG according to which SG is represented by a matrix product L.D.L*, wherein L is a 2×2 lower triangular matrix with ones as diagonal coefficients, D is a 2×2 diagonal matrix, and L* is the adjoint matrix of L, wherein matrix L is of form $$(l_{10} \quad 1),$$

the method further comprising: computing coefficient $l_{10}$ of the matrix L as $l_{10} = \overline{g_{01}}/g_{00}$ wherein the signature generation matrix SG is of form $$\begin{pmatrix} g_{00} & g_{01} \\ g_{10} & g_{11} \end{pmatrix},$$

where $g_{00}$ and $g_{11}$ are real polynomials, and $g_{10}$ and $g_{01}$ are complex polynomials, and $g_{10}$ is equal to complex conjugate $\overline{g_{10}}$ of $g_{01}$, D is of form $$\begin{pmatrix} d_{00} & 0 \\ 0 & d_{11} \end{pmatrix}$$

and determined as $$\begin{pmatrix} g_{00} & 0 \\ 0 & g_{11} - \dfrac{|g_{01}|^2}{g_{00}} \end{pmatrix},$$

and wherein computing the coefficient $l_{10}$ of the matrix L comprises: computing inverse $1/g_{00}$ of real coefficient $g_{00}$, and performing a real-complex multiplication of $1/g_{00}$ with the complex polynomial $\overline{g_{01}}$; and managing storing in a memory buffer of the computer system of the coefficients of the signature generation matrix SG and coefficients of the matrices of the LDL representation based on:

where the memory buffer is used alternatively to store coefficients of the signature generation matrix SG or coefficients of the matrix D of the LDL representation and the coefficient $d_{11}$ is stored in the memory buffer by overwriting one or more coefficients of the signature generation matrix SG.

11. The apparatus according to claim 9, wherein the memory buffer is dimensioned for storing complex non-diagonal coefficients and real diagonal coefficients of the signature generation matrix SG.

12. The apparatus according to claim 9, wherein the key B has a matrix structure, and the signature generation matrix is determined based on matrix product B.B*, wherein B* is adjoint matrix of B.

13. The apparatus according to claim 9, wherein the key B has a matrix structure, and the signature generation matrix is determined based on matrix product $\hat{B}.\hat{B}*$, wherein $\hat{B}*$ is adjoint matrix of $\hat{B}$, and wherein $\hat{B}$ is obtained based on a transform of the matrix B in a frequency domain.

14. The non-transitory computer-readable medium according to claim 10, wherein the memory buffer is dimensioned for storing complex non-diagonal coefficients and real diagonal coefficients of the signature generation matrix SG.

15. The non-transitory computer-readable medium according to claim 10, wherein the key B has a matrix structure, and the signature generation matrix is determined based on the matrix product B.B*, wherein B* is adjoint matrix of B.

* * * * *